(12) United States Patent
Agiwal et al.

(10) Patent No.: US 11,832,308 B2
(45) Date of Patent: Nov. 28, 2023

(54) METHOD AND APPARATUS FOR PERFORMING RANDOM ACCESS PROCEDURE

(71) Applicant: Samsung Electronics Co., Ltd., Suwon-si (KR)

(72) Inventors: Anil Agiwal, Suwon-si (KR); Mangesh Abhimanyu Ingale, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 5 days.

(21) Appl. No.: 17/145,763

(22) Filed: Jan. 11, 2021

(65) Prior Publication Data

US 2021/0136832 A1    May 6, 2021

Related U.S. Application Data

(63) Continuation of application No. 15/963,754, filed on Apr. 26, 2018, now abandoned.

(30) Foreign Application Priority Data

Apr. 26, 2017  (IN) .............................. 201731014799

(51) Int. Cl.
*H04W 74/08* (2009.01)
*H04W 52/36* (2009.01)
(Continued)

(52) U.S. Cl.
CPC ..... *H04W 74/0833* (2013.01); *H04W 52/325* (2013.01); *H04W 52/36* (2013.01); *H04W 52/50* (2013.01); *H04W 74/008* (2013.01)

(58) Field of Classification Search
CPC ........... H04W 74/0833; H04W 74/008; H04W 74/0875; H04W 52/325; H04W 52/36;
(Continued)

(56) References Cited

U.S. PATENT DOCUMENTS

2011/0274040 A1  11/2011  Pani et al.
2012/0257510 A1*  10/2012  Jeong ................ H04W 56/0005
                                                      370/242
(Continued)

FOREIGN PATENT DOCUMENTS

CA       2725771 A1 * 12/2009  ............ H04W 24/02
WO    2014/065593 A1    5/2014
(Continued)

OTHER PUBLICATIONS

"The remaining issues of prioritized RA procedure",3GPP Draft; R2-1804501, vol. RAN WG2, No. Sanya, China; Apr. 16, 2018-Apr. 20, 2018, Apr. 6, 2018 (Apr. 6, 2018), XP051415533.
(Continued)

*Primary Examiner* — Ricardo H Castaneyra
(74) *Attorney, Agent, or Firm* — Jefferson IP Law, LLP

(57) ABSTRACT

A communication method and system for converging a fifth generation (5G) communication system for supporting higher data rates beyond a fourth generation (4G) system with a technology for internet of things (IoT) are provided. The communication method and system may be applied to intelligent services based on the 5G communication technology and the IoT-related technology, such as smart home, smart building, smart city, smart car, connected car, health care, digital education, smart retail, security and safety services. A method of a terminal for performing a random access procedure is provided. The method includes transmitting a random access preamble associated with a random access procedure to a base station, receiving a random access response including information on a backoff parameter value from the base station, identifying a scaling factor for backoff based on a priority of the random access procedure or an event which triggers the random access procedure, determining a random backoff time based on the scaling factor and the backoff parameter value, and trans-
(Continued)

mitting a subsequent random access preamble after the random backoff time to the base station.

8 Claims, 15 Drawing Sheets

(51) Int. Cl.
*H04W 52/32* (2009.01)
*H04W 52/50* (2009.01)
*H04W 74/00* (2009.01)

(58) Field of Classification Search
CPC ..... H04W 52/50; H04W 48/12; H04W 48/14; H04W 74/085
See application file for complete search history.

(56) References Cited

U.S. PATENT DOCUMENTS

| | | | |
|---|---|---|---|
| 2013/0021997 A1 | 1/2013 | Lee | |
| 2013/0035084 A1* | 2/2013 | Song | H04W 52/48 455/418 |
| 2013/0294233 A1 | 11/2013 | Kim et al. | |
| 2014/0334389 A1 | 11/2014 | Abdel-Samad et al. | |
| 2015/0282214 A1 | 10/2015 | Lee et al. | |
| 2016/0014672 A1 | 1/2016 | Jang et al. | |
| 2016/0105912 A1 | 4/2016 | Stattin et al. | |
| 2017/0251500 A1 | 8/2017 | Agiwal et al. | |
| 2017/0359840 A1* | 12/2017 | Ly | H04L 1/1887 |
| 2018/0049244 A1* | 2/2018 | Lee | H04W 76/27 |
| 2018/0288683 A1 | 10/2018 | Bendlin et al. | |
| 2019/0098540 A1 | 3/2019 | Lee et al. | |
| 2019/0215760 A1* | 7/2019 | Lin | H04W 88/023 |
| 2020/0288451 A1* | 9/2020 | Lee | H04W 72/046 |

FOREIGN PATENT DOCUMENTS

| | | | | |
|---|---|---|---|---|
| WO | WO-2016086144 A1 * | 6/2016 | | H04B 7/0617 |
| WO | 2016/198909 A1 | 12/2016 | | |
| WO | 2019/120311 A1 | 6/2019 | | |

OTHER PUBLICATIONS

Qualcomm et al: "Converged proposal for prioritized random access for NR", 3GPP Draft; R2-1708720, vol. RAN WG2, No. Berlin, Germany; Aug. 21, 2017-Aug. 25, 2017 Aug. 20, 2017 (Aug. 20, 2017), XP051318525.
China Mobile et al: "Backoff for UEs of different priorities", 3GPP Draft; R2-080750, vol. RAN WG2, No. Sorrento, Italy; Feb. 5, 2008, Feb. 5, 2008 (Feb. 5, 2008), XP050138577.
Qualcomm Incorporated: "Delivery of System information", 3GPP Draft; R2-1701813, vol. RAN WG2, No. Athens, Greece; Feb. 13, 2017-Feb. 17, 2017 Feb. 12, 2017 (Feb. 12, 2017), XP051212379.
CMCC et al:"Differentiate access causes in RACFI backoff", 3GPP Draft; R2-082547,vol. RAN WG2,No. Kansas City, USA; Apr. 29, 2008, Apr. 29, 2008 (Apr. 29, 2008), XP050140219.
Asustek et al: "Details of prioritized random access for NR", 3GPP Draft; R2-1801430, vol. RAN WG2, No. Vancouver, Canada; Jan. 22, 2018-Jan. 26, 2018 Jan. 12, 2018 (Jan. 12, 2018), XP051386839.
Extended European Search Reported dated Feb. 25, 2020, issued in European Patent Application No. 18791721.6.
International Search Report dated Aug. 7, 2018, issued in the International application No. PCT/KR2018/004851.
Indian Office Action dated Feb. 23, 2022, issued in a counterpart Indian Application No. 201937043212.
Korean Office Action dated Aug. 22, 2022, issued in a counterpart Korean Application No. 10-2019-7034991.
Chinese Office Action dated Nov. 8, 2022, issued in a counterpart Chinese Application No. 201880027640.8.
3GPP TS 36.321 V14.2.0; 3rd Generation Partnership Project; Technical Specification Group Radio Access Network; Evolved Universal Terrestrial Radio Access (E-UTRA); Medium Access Control (MAC) protocol specification (Release 14), Mar. 22, 2017.
InterDigital Communications; Procedure for Request and Acquisition of Other-SI; 3GPP TSG-RAN WG2 Meeting #97bis; R2-1702877; Mar. 25, 2017, Spokane, Washington.
Huawei et al., Msg1 vs Msg 3 for On-Demand Request, R2-1702619, 3GPP TSG-RAN2 Meeting #97bis, Spokane, Washington, USA, Apr. 3-7, 2017.
Lenovo et al., Details of On-demand SI requests, R2-1702733, 3GPP TSG-RAN WG2 Meeting #97bis, Spokane, USA, Apr. 3-7, 2017.
Spreadtrum Communications, On demand SI request, R2-1702758, 3GPP TSG-RAN WG2 Meeting #97bis, Spokane, USA, Apr. 3-7, 2016.
Ericsson, Open issues of on-demand Si, R2-1702857, 3GPP TSG-RAN WG2 #97bis, Spokane, USA, Apr. 3-7, 2017.
Nokia et al., Signalling for on-demand system information, R2-1702905, 3GPP TSG-RAN WG2 Meeting #97bis, Spokane, USA, Apr. 3-7, 2017.
Samsung et al., On Demand SI Request TX, R2-1702970, 3GPP TSG-RAN WG2 Meeting #97bis, Spokane, USA, Apr. 3-7, 2017.
ETSI MCC, Report of 3GPP TSG RAN2 meeting #97bis, Spokane, USA, R2-1704001, 3GPP TSG-RAN WG2 meeting #98, Hangzhou, China, May 15-19, 2017.
ETSI MCC, Report of 3GPP TSG RAN WG2 NR AdHoc#2 meeting, Qingdao, China, R2-1707602, 3GPP TSG-RAN WG2 meeting #99, Berlin, Germany, Aug. 21-25, 2017.
Korean Notice of Allowance dated Feb. 24, 2023, issued in Korean Patent Application No. 10-2019-7034991.

* cited by examiner

METHOD AND APPARATUS FOR PERFORMING RANDOM ACCESS PROCEDURE

CROSS-REFERENCE TO RELATED APPLICATION(S)

This application is a continuation application of prior application Ser. No. 15/963,754, filed on Apr. 26, 2018, which is based on and claims priority under 35 U.S.C. § 119 of an Indian patent application number 201731014799, filed on Apr. 26, 2017, in the Indian Patent Office, the disclosure of which is incorporated by reference herein in its entirety.

BACKGROUND

1. Field

The disclosure relates to a system, a method and an apparatus for performing a random access procedure in a wireless communication system. More particularly, the disclosure relates to a method for on demand system information (SI) acquisition error handling, a random access (RA) backoff method and a power ramping method.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'beyond 4G network' or a 'post long term evolution (LTE) System'. The 5G wireless communication system is considered to be implemented not only in lower frequency bands but also in higher frequency (mmWave) bands, e.g., 10 GHz to 100 GHz bands, so as to accomplish higher data rates. These frequency bands can be licensed or unlicensed. To mitigate propagation loss of the radio waves and increase the transmission distance, the beamforming, massive multiple-input multiple-output (MIMO), full dimensional MIMO (FD-MIMO), array antenna, an analog beam forming, and large scale antenna techniques are being considered in the design of the 5G wireless communication system. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

In the recent years several broadband wireless technologies have been developed to meet the growing number of broadband subscribers and to provide more and better applications and services. The second generation (2G) wireless communication system has been developed to provide voice services while ensuring the mobility of users. The third generation (3G) wireless communication system supports not only the voice service but also data service. The 4G wireless communication system has been developed to provide high-speed data service. However, the 4G wireless communication system suffers from lack of resources to meet the growing demand for high speed data services. Therefore, the 5G wireless communication system is being developed to meet the growing demand of various services with diverse requirements, e.g. high speed data services, support ultra-reliability and low latency applications.

In addition, the 5G wireless communication system is expected to address different use cases having quite different requirements in terms of data rate, latency, reliability, mobility, etc. However, it is expected that the design of the air-interface of the fifth generation wireless communication system would be flexible enough to serve the user equipments (UEs) having quite different capabilities depending on the use case and market segment the UE cater service to the end customer. Example use cases the 5G wireless communication system wireless system is expected to address is enhanced Mobile Broadband (eMBB), massive MTC (m-MTC), ultra-reliable low latency communication (URLL), etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the IoT/IoE envisioning connectivity of billions of devices. The URLL requirements like very low latency, very high reliability and variable mobility so on and so forth address the market segment representing the industrial automation application, vehicle-to-vehicle/vehicle-to-infrastructure communication foreseen as one of the enabler for autonomous cars.

In the 4G wireless communication system, enhanced node B (eNB) or base station in cell broadcast system information (SI), is structured into master information block (MIB) and a set of system information blocks (SIBs). MIB consists of system frame number (SFN), downlink system bandwidth and physical hybrid automatic repeat request (ARQ) feedback indicator channel (PHICH) configuration. MIB is transmitted every 40 ms. It is repeated every 10 ms wherein the first transmission occurs in subframe #0 when SFN mod 4 equals zero. MIB is transmitted on physical broadcast channel (PBCH). SIB type 1 (i.e. SIB 1) carries cell identity, tracking area code, cell barring information, value tag (common for all scheduling units), and scheduling information of other SIBs. SIB 1 is transmitted every 80 ms in subframe #5 when SFN mod 8 equals zero. SIB 1 is repeated in subframe #5 when SFN mod 2 equals zero. SIB 1 is transmitted on physical downlink shared channel (PDSCH). Other SIBs (i.e. SIB 2 to SIB 19) are transmitted in SI message wherein scheduling information on these SIBs are indicated in SIB 1.

The 5G wireless communication system is considering enhancement to deliver SI. In the 5G wireless communication SI is divided into minimum SI and other SI. Similar to LTE SI the other SI can be structured into a set of SI-blocks (SIBs).

Minimum SI is periodically broadcast. Other SI can be broadcasted or provided on-demand based on the UE request. The minimum SI comprises basic information required for initial access to a cell and information for acquiring any other SI broadcasted or provisioned via on-demand basis. The minimum SI includes at least SFN, list of public land mobile network (PLMN), cell identifier (ID), cell camping parameters and random access channel (RACH) parameters. If the network allows an on demand mechanism, parameters required for requesting other SIB(s) (if any needed, e.g. RACH preambles for request) are also included in minimum SI.

The scheduling information in minimum SI includes an indicator which indicates whether the concerned SIB is broadcasted or provided on demand. The scheduling information on the other SI includes SIB type, validity information, SI periodicity and SI-window information. The scheduling information on the other SI is provided irrespective of whether the other SI is broadcasted or not. If minimum SI indicates that a SIB is not broadcasted (i.e. it is provided on demand), then the UE does not assume that this SIB is a broadcasted in its SI-window at every SI period. Therefore the UE may send an SI request to receive this SIB. For other SI provided on-demand, the UE can request one or more SIB(s) or all SIBs or SI message(s) or all SI messages in a single request.

For idle and inactive mode, there will be network control whether MSG1 or MSG3 can be used to transmit the SI request.

If the physical ransom access channel (PRACH) preamble and/or PRACH resource specific to each SIB or set of SIBs or each SI message or all SI messages which the UE needs to acquire is included in minimum SI then the SI request is indicated using MSG1.

If the PRACH preamble and/or PRACH resource specific to each SIB or set of SIBs or each SI message or all SI messages which the UE needs to acquire is not included in minimum SI then the SI request is included in MSG3.

After sending the SI request, like any other transmission it is possible that the SI request transmission fails or it is possible that the SI request transmission is successful but the UE fails to receive the system information transmitted by network based on the UE's request. A method is needed to handle such failures is needed.

During the random access procedure, UE first transmits the PRACH preamble and then waits for RAR in the RAR window corresponding to its RACH preamble transmission. Sometimes due to congestion on PRACH channel, PRACH preamble transmission may not be successful. In the current system, in such a situation network sends RAR with back off indicator/index (BI). UE then backoff i.e. UE retransmits PRACH preamble after a time period which is randomly selected between 0 and backoff value. The backoff value corresponding to backoff index received in RAR, is obtained by UE from a pre-defined backoff table. All UEs perform backoff in similar manner. During the PRACH preamble retransmission UE ramps up the power by PowerRampingStep. PowerRampingStep is signaled in SI. All UEs apply same PowerRampingStep. The current mechanism is not efficient as latency requirement may be different for different UEs. A method is needed to reduce latency.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G) system.

Additional aspects will be set forth in part in the description which follows and, in part, will be apparent from the description, or may be learned by practice of the presented embodiments.

In accordance with a first aspect of the disclosure, a method of a terminal for performing a random access procedure is provided. The method includes transmitting a random access preamble associated with a random access procedure to a base station, receiving a random access response including information on a backoff parameter value from the base station, identifying a scaling factor for backoff based on a priority of the random access procedure or identifying a scaling factor for backoff based on an event which triggers the random access procedure, determining a random backoff time based on the scaling factor and the backoff parameter value, and transmitting a subsequent random access preamble after the random backoff time to the base station.

In accordance with a second aspect of the disclosure, a method of a base station for performing a random access procedure is provided. The method includes receiving a random access preamble associated with a random access procedure from a terminal, transmitting a random access response including information on a backoff parameter value to the terminal, and receiving a subsequent random access preamble after a random backoff time from the terminal. The random backoff time is determined based on a scaling factor for backoff and the backoff parameter value. The scaling factor is determined based on a priority of the random access procedure or based on an event which triggers the random access procedure.

In accordance with a third aspect of the disclosure, a terminal is provided. The terminal includes a transceiver and a controller coupled with the transceiver. The transceiver is configured to receive signals from a base station and to transmit signals to the base station. The controller is configured to control the transceiver to transmit a random access preamble associated with a random access procedure to the base station, control the transceiver to receive a random access response including information on a backoff parameter value from the base station, identify a scaling factor for backoff based on a priority of the random access procedure or identifying a scaling factor for backoff based on an event which triggers the random access procedure, determine a random backoff time based on the scaling factor and the backoff parameter value, and control the transceiver to transmitting a subsequent random access preamble to the base station after the random backoff time.

In accordance with a fourth aspect of the disclosure, a base station is provided. The base station includes a transceiver and a controller coupled with the transceiver is provided. The transceiver is configured to receive signals from a terminal and to transmit signals to the terminal. The controller is configured to control the transceiver to receive a random access preamble associated with a random access procedure from the terminal, control the transceiver to transmit a random access response including information on a backoff parameter value to the terminal, and control the transceiver to receive a subsequent random access preamble after a random backoff time from the terminal. The random backoff time is determined based on a scaling factor for backoff and the backoff parameter value. The scaling factor is determined based on a priority of the random access procedure or based on an event which triggers the random access procedure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
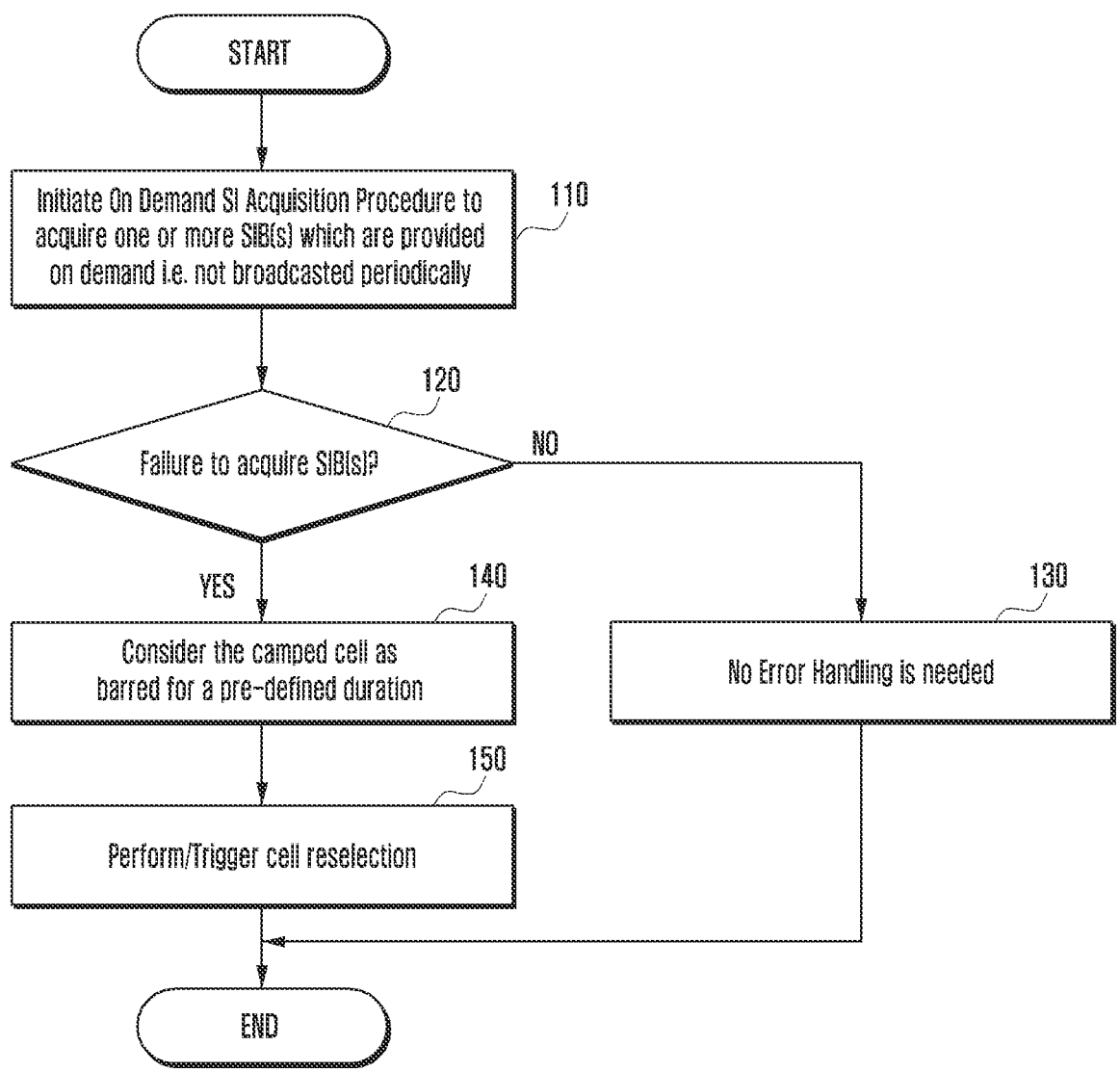
FIG. 1 illustrates a method for on demand system information (SI) acquisition error handling according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), or 5G NB (5GNB).

The "UE" is an entity communicating with a BS and may be referred to as the UE, device, mobile station (MS), mobile equipment (ME), or terminal.

On Demand System Information (SI) Acquisition Error Handling

Embodiment 1

The system information is divided into minimum SI and other SI. The minimum SI is periodically broadcast. Minimum SI may comprise of MIB and one or more SIBs. Other SI can be broadcasted or provided on-demand based on (UE) request. The minimum SI comprises basic information required for initial access to a cell and information for acquiring any other SI broadcast periodically or provisioned via on-demand basis. The minimum SI includes at least system frame number (SFN), list of public land mobile network (PLMN), cell identifier (ID), cell camping parameters, and random access channel (RACH) parameters. If network allows an on demand mechanism, parameters required for requesting other system information block(s) (SIB(s)) (if any needed, e.g. RACH preambles and/or RACH time/frequency resources for request) are also included in minimum SI. The scheduling information in minimum SI includes an indicator which indicates whether the concerned SIB is broadcasted or provided on demand. The scheduling information for the other SI includes SIB type, validity information, SI periodicity and SI-window information. The scheduling information for the other SI is provided irrespective of whether the other SI is periodically broadcasted or not. If minimum SI indicates that a SIB is not broadcasted (i.e. it is provided on demand), then the UE does not assume that this SIB is broadcasted in its SI-window at every SI period. Therefore the UE may initiate on demand SI acquisition procedure i.e. send an SI request to receive this SIB.

For other SI provided on-demand, the UE can request one or more SIB(s) or all SIBs or SI message or all SI messages in a single request. For idle and inactive mode, MSG1 or MSG3 can be used to transmit the SI request. Network controls whether MSG1 or MSG3 is used to transmit the SI request. If the physical ransom access channel (PRACH) preamble and/or PRACH resource specific to each SIB or set of SIBs which the UE needs to acquire is included in minimum SI then the SI request is indicated using MSG1. If the PRACH preamble and/or PRACH resource specific to each SIB or set of SIBs which the UE needs to acquire is not included in minimum SI then the SI request is included in MSG3. The UE may also transition from idle or inactive state to connected state using connection setup procedure and send the SI request in dedicated radio resource control (RRC) signaling.

After initiating the on demand SI acquisition procedure, the UE may fail to acquire desired SIB(s) or SI message(s). The failure can be because of one of the following reasons:

a) Failure to transmit the SI request successfully: After sending the SI request, gNB, which is a $3^{rd}$ Generation Partnership Project (3GPP) fifth generation (5G) Next Generation base station which supports the 5G New Radio (NR), may send an acknowledgment indicating the SI request is received. The UE may retransmit the SI request if the UE does not receive acknowledgment. The SI request transmission can be declared as failed if the UE has not received acknowledgment even after transmitting the SI request for maximum number of retries.

In case the SI request is indicated using MSG1 i.e. PRACH preamble transmission, gNB sends a random access response (RAR) indicating reception of PRACH preamble indicating the SI request. In this case RAR is acknowledgment from network that the SI request is received. If RAR is not received successfully after transmitting PRACH preamble, the UE retransmit the PRACH preamble indicating the SI request. The SI request transmission can be declared as failed if the UE has not received RAR even after transmitting PRACH preamble indicating the SI request for maximum number of retries. In an embodiment RAR is successfully received if the RAR corresponds to both PRACH resource and random access preamble identifier (RAPID) used by the UE for PRACH preamble transmission. In an embodiment RAR is successfully received if the RAR corresponds to RAPID of PRACH preamble transmitted by the UE. In another embodiment RAR is successfully received if the RAR corresponds to PRACH resource used by the UE for PRACH preamble transmission. In an embodiment if the UE receives RAR scheduled using physical downlink control channel (PDCCH) addressed to its random access-radio network temporary identifier (RA-RNTI) (or reserved RNTI) and the received RAR indicates that at least the SIB(s) which the UE has requested will be transmitted or network has received the request for them, then the UE can stop monitoring RAR in RAR window and consider RAR reception as successful. Note that RAR may include SIB(s) which the UE has not requested as well.

In case the SI request is indicated using MSG3, gNB sends an MSG4 indicating reception of the SI request. In this case MSG4 is acknowledgment from network that the SI request is received. If MSG4 is not received successfully after transmitting MSG3, the UE retransmit the PRACH preamble or the MSG3 indicating the SI request. The SI request transmission can be declared as failed if the UE has not received MSG4 even after transmitting PRACH preamble or MSG3 indicating the SI request for maximum number of retries. In an embodiment MSG4 is successfully received (or contention resolution is successful) if the MSG4 includes the contents (at least the first X bytes of common control channel (CCCH) service data unit (SDU) transmitted in MSG3, X is pre-defined) of MSG3 sent by the UE. In another embodiment MSG4 is successfully received if the MSG4 includes at least the SI request message sent by the UE in MSG3 and the UE ID included in MSG3. In an embodiment if the UE receives MSG4 scheduled using PDCCH addressed to its temporary cell RNTI (T-CRNTI) (i.e. temporary CRNTI provided to the UE in RAR) and the received MSG4 indicates that at least the SIB(s) which UE has requested will be transmitted or network has received the request for them, then the UE can start monitoring SI window according to scheduling information to acquire requested SIB(s). Note that MSG4 may include indication for additional SIB(s) apart from SIB(s) which the UE has requested in MSG3.

b) Failure to receive the SI transmitted by the network based on the UE's request: After transmitting the SI request or after receiving the acknowledgment for the SI request, the UE monitors the requested SIB(s) in SI window(s) according to scheduling information of one or more SI periods of requested SIB(s). If the UE fails to receive the requested SIB(s), the UE may retransmit the SI request. SI reception can be declared as failed if the UE cannot receive even after transmitting The SI request successfully for maximum number of retries. Maximum number of retries can be pre-defined or signaled by the network in minimum SI.

c) Failure of random access procedure: Random access procedure can be used to transmit the SI request. If the UE fails to receive RAR during the RAR window even after transmitting the PRACH preamble for fixed number of times (preambleTxMax) or contention resolution timer expires even after transmitting the PRACH preambles for fixed number of times (preambleTxMax), random access procedure failure or problem is declared. The parameter preambleTxMax is configured by the network. Upon detection of random access problem, the media access control (MAC) entity in the UE indicates random access problem to higher layer (i.e. RRC). In an embodiment, in case the random access procedure was initiated for SI request, upon detection of random access problem, MAC entity also stops the ongoing random access procedure. In case the random access procedure was not initiated for SI request, upon detection of random access problem, MAC entity in UE does not stop the ongoing random access procedure. In another embodiment, in case the random access procedure was initiated for SI request, upon detection of random access problem, MAC entity indicates random access problem to higher layer (i.e. RRC). Upon receiving the random access problem indication from lower layer (i.e. MAC) and if UE is in RRC INACTIVE or RRC IDLE state and random access procedure was initiated for SI request (or RRC is waiting for acknowledgement for SI request from lower layers), RRC informs the lower layer (i.e. MAC) to stop the ongoing random access procedure. In another embodiment, in case the random access procedure was initiated for SI request, upon detection of random access problem, MAC entity indicates random access problem to higher layer (i.e. RRC). Upon receiving the random access problem indication from lower layer (i.e. MAC) and if random access procedure was initiated for SI request (or RRC is waiting for acknowledgement for SI request from lower layers), RRC informs the lower layer (i.e. MAC) to stop the ongoing random access procedure.

d) Failure to setup connection (connection setup timer expires).

FIG. 1 illustrates a method for on demand SI acquisition error handling according to an embodiment of the disclosure.

Referring to FIG. 1, the UE (in idle/inactive state) initiates on demand SI acquisition procedure to acquire one or more SIB(s) or SI message(s) which are provided on demand, i.e. not being broadcasted at operation 110. The UE determines whether there is a failure to acquire desired SIB(s) or SI message(s) at operation 120. The various ways to determine failure are explained earlier in the disclosure. If the UE acquires the desired SIB(s) or SI message(s) successfully using on demand SI acquisition procedure, no error handling is needed (130). However, if the UE fails to acquire the desired SIB(s) or SI message(s) using on demand SI acquisition procedure, the UE shall declare SI acquisition failure and start the pre-defined timer. While the timer is running, the UE considers the camped cell as barred at operation 140. The UE may performs/trigger cell reselection if another suitable cell is found while the timer is running at operation 150. The UE may also re-try the SI request on the camped cell upon expiry of the timer.

Embodiment 2

The system information is divided into minimum SI and other SI. Minimum is broadcasted. Minimum SI may comprise of MIB and one or more SIBs. Other SI can be broadcasted or provided on-demand based on the UE request. The minimum SI comprises basic information required for initial access to a cell and information for acquiring any other SI broadcast periodically or provisioned via on-demand basis. The minimum SI includes at least SFN, list of PLMN, cell ID, cell camping parameters, and RACH parameters. If the network allows the on demand mechanism, parameters required for requesting other SIB(s) (if any needed, e.g. RACH preambles and/or RACH time/frequency resources for request) are also included in minimum SI. The scheduling information in minimum SI includes an indicator which indicates whether the concerned SIB or SI message is being broadcasted or provided on demand. The scheduling information for the other SI includes SIB type, validity information, SI periodicity and SI-window information. The scheduling information for the other SI is provided irrespective of whether the other SI is broadcasted or not. If minimum SI indicates that a SIB is not broadcasted (i.e. it is provided on demand), then the UE does not assume that this SIB is a broadcasted in its SI-window at every SI period. Therefore the UE may initiate on demand SI acquisition procedure i.e. send an SI request to receive this SIB or SI message.

For other SI provided on-demand, the UE can request one or more SIB(s) or all SIBs or SI message or all SI messages in a single request. For idle and inactive mode, MSG1 or MSG3 can be used to transmit the SI request. Network controls whether MSG1 or MSG3 is used to transmit the SI request. If the PRACH preamble and/or PRACH resource specific to each SIB or set of SIBs which the UE needs to acquire is included in minimum SI then the SI request is indicated using MSG1. If the PRACH preamble and/or PRACH resource specific to each SIB or set of SIBs which the UE needs to acquire is not included in minimum SI then the SI request is included in MSG3. The UE may also transition from idle or inactive state to connected state using connection setup procedure and send the SI request in dedicated RRC signaling.

After initiating the on demand SI acquisition procedure, the UE may fail to acquire desired SIB(s) or SI message(s). The failure can be because of one of the following reasons:

a) Failure to transmit the SI request successfully: After sending the SI request, gNB may send an acknowledgment indicating SI request is received. UE may retransmit the SI request if the UE does not receive acknowledgment. The SI request transmission can be declared as failed if the UE has not received acknowledgment even after transmitting the SI request for maximum number of retries.

In case the SI request is indicated using MSG1 i.e. PRACH preamble transmission, gNB sends an RAR indicating reception of PRACH preamble indicating the SI request. In this case RAR is acknowledgment from network that the SI request is received. If RAR is not received successfully after transmitting PRACH preamble, the UE retransmit the PRACH preamble indicating the SI request. The SI request transmission can be declared as failed if the UE has not received RAR even after transmitting PRACH preamble indicating the SI request for maximum number of retries. In an embodiment RAR is successfully received if the RAR corresponds to both PRACH resource and RAPID used by the UE for PRACH preamble transmission. In an embodiment RAR is successfully received if the RAR corresponds to RAPID of PRACH preamble transmitted by the UE. In another embodiment RAR is successfully received if the RAR corresponds to PRACH resource used by the UE for PRACH preamble transmission. In an embodiment if the UE receives RAR scheduled using PDCCH addressed to its RA-RNTI (or reserved RNTI) and the received RAR indicates that at least the SIB(s) which the UE has requested will be transmitted or network has received the request for them, then the UE can stop monitoring RAR in RAR window and consider RAR reception as successful. Note that RAR may include SIB(s) which the UE has not requested as well.

In case the SI request is indicated using MSG3, gNB sends an MSG4 indicating reception of the SI request. In this case MSG4 is acknowledgment from network that the SI request is received. If MSG4 is not received successfully after transmitting MSG3, the UE retransmit the PRACH preamble or the MSG3 indicating the SI request. The SI request transmission can be declared as failed if the UE has not received MSG4 even after transmitting PRACH preamble or MSG3 indicating the SI request for maximum number of retries. In an embodiment MSG4 is successfully received if the MSG4 includes the contents (at least the first X bytes of CCCH SDU transmitted in MSG3, X is pre-defined) of MSG3 sent by the UE. In another embodiment MSG4 is successfully received if the MSG4 includes at least the SI request message sent by the UE in MSG3 and the UE ID included in MSG3. In an embodiment if the UE receives MSG4 scheduled using PDCCH addressed to its T-CRNTI (i.e. temporary CRNTI provided to the UE in RAR) and the received MSG4 indicates that at least the SIB(s) which the UE has requested will be transmitted or network has received the request for them, then the UE can start monitoring SI window according to scheduling information to acquire requested SIB(s). Note that MSG4 may include indication for additional SIB(s) apart from SIB(s) which the UE has requested in MSG3.

b) Failure to receive the SI transmitted by network based on the UE's request: After transmitting the SI request or after receiving the acknowledgment for the SI request, the UE monitors the requested SIB(s) in SI window(s) according to scheduling information of one or more SI periods of requested SIB(s). If the UE fails to receive the requested SIB(s), the UE may retransmit the SI request. The SI reception can be declared as failed if the UE cannot receive even after transmitting the SI request successfully for maximum number of retries. Maximum number of retries can be pre-defined or signaled by network in minimum SI.

c) Failure of random access procedure: Random access procedure can be used to transmit the SI request. If the UE fails to receive RAR during RAR window even after transmitting the PRACH preambles for fixed number of times (preambleTxMax) or contention resolution timer expires even after transmitting the PRACH preambles for fixed number of times (preambleTxMax), random access procedure failure or problem is declared. The parameter preambleTxMax is configured by the network. Upon detection of random access problem, the MAC entity in the UE indicates random access problem to higher layer (i.e. RRC). In an embodiment, in case the random access procedure was initiated for SI request, upon detection of random access problem, MAC entity also stops the ongoing random access procedure. In case the random access procedure was not initiated for SI request, upon detection of random access problem, MAC entity in UE does not stop the ongoing random access procedure. In another embodiment, in case the random access procedure was initiated for SI request, upon detection of random access problem, MAC entity indicates random access problem to higher layer (i.e. RRC). Upon receiving the random access problem indication from lower layer (i.e. MAC) and if UE is in RRC INACTIVE or RRC IDLE state and random access procedure was initiated for SI request (or RRC is waiting for acknowledgement for SI request from lower layers), RRC informs the lower layer (i.e. MAC) to stop the ongoing random access procedure. In another embodiment, in case the random access procedure was initiated for SI request, upon detection of random access problem, MAC entity indicates random access problem to higher layer (i.e. RRC). Upon receiving the random access problem indication from lower layer (i.e. MAC) and if random access procedure was initiated for SI request (or RRC is waiting for acknowledgement for SI request from lower layers), RRC informs the lower layer (i.e. MAC) to stop the ongoing random access procedure.

d) Failure to setup connection (connection setup timer expires).

Figure 2:
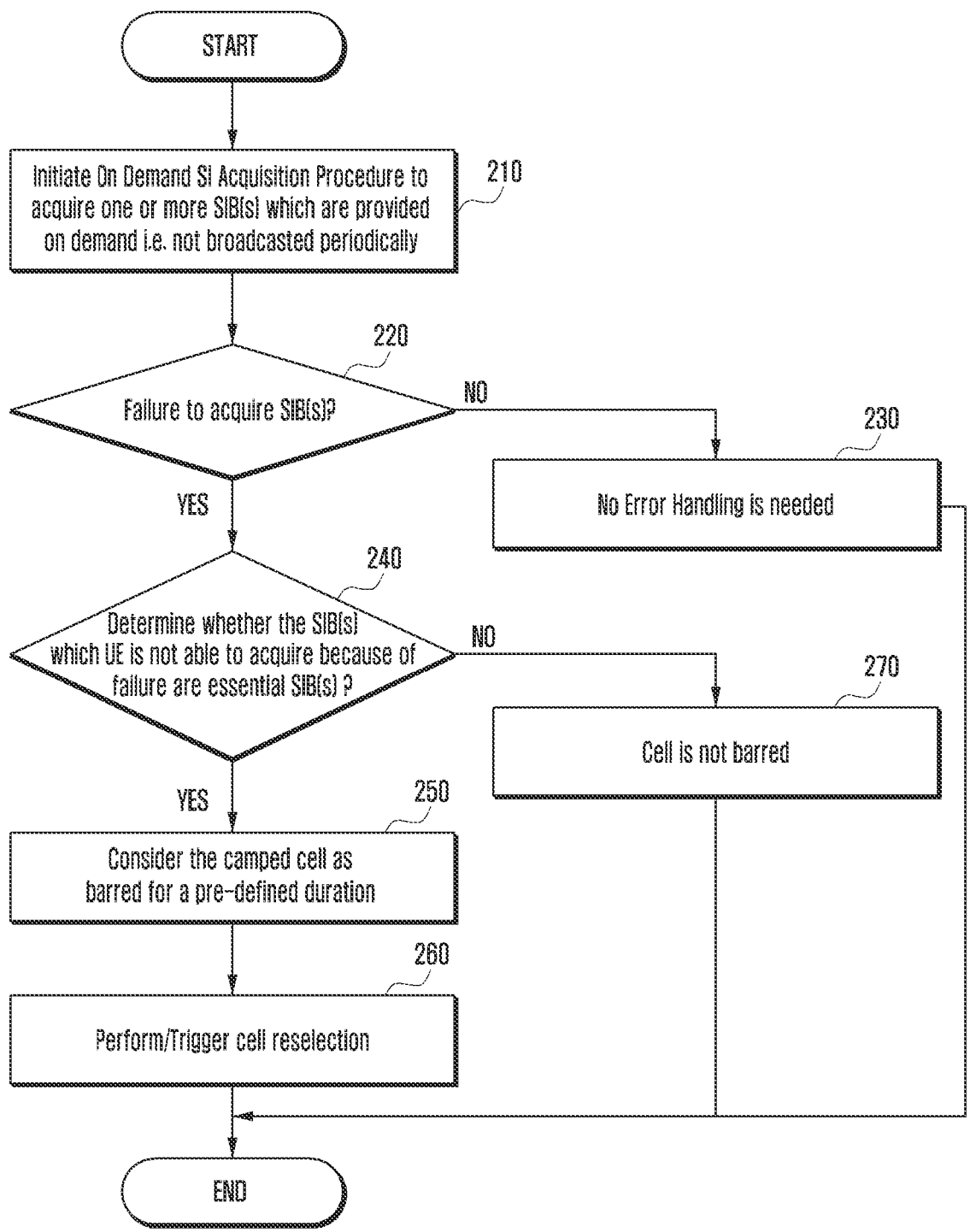
FIG. 2 illustrates a method for on demand SI acquisition error handling according to an embodiment of the disclosure.

FIG. 2 illustrates a method for on demand SI acquisition error handling according to an embodiment of the disclosure.

Referring to FIG. 2, similar to Embodiment 1, the UE (in idle/inactive state) initiates on demand SI acquisition procedure to acquire one or more SIB(s) or SI message(s) which are provided on demand, i.e. not being broadcasted at operation 210. The UE determines whether there is a failure to acquire desired SIB(s) at operation 220. The various ways to determine failure are explained earlier in the disclosure. If the UE acquires the desired SIB(s) or SI message(s) successfully using on demand SI acquisition procedure, then no error handling is needed at operation 230. However, if the UE fails to acquire the desired SIB(s) or SI message(s) using on demand SI acquisition procedure, the UE determines whether the SIB(s) which the UE is not able to acquire are essential SIB(s) or not at operation 240. SIB(s) which are essential are pre-defined. Some of the essential SIB(s) can also be provided on demand. The essential SIB(s) are the SIBs which the UE needs to acquire mandatorily. If the SIB(s) which the UE is not able to acquire are the essential SIB(s) then the UE shall declare SI acquisition failure and start the pre-defined timer. While the timer is running the UE considers the camped cell as barred for pre-defined duration at operation 250. The UE may performs/trigger cell reselection if another suitable cell is found while the timer is running at operation 260. The UE may also re-try the SI request on the camped cell upon expiry of the timer. If the SIB(s) which the UE is not able to acquire because of failure are not essential, the UE does not consider the camped cell as barred at operation 270.

Embodiment 3

The system information is divided into minimum SI and other SI. Minimum SI is periodically broadcast. Minimum SI may comprise of MIB and one or more SIBs. Other SI can be broadcasted or provided on-demand based on the UE request. The minimum SI comprises basic information required for initial access to a cell and information for acquiring any other SI broadcast periodically or provisioned via on-demand basis. The minimum SI includes at least SFN, list of PLMN, cell ID, cell camping parameters, and RACH parameters. If the network allows the on demand mechanism, parameters required for requesting other SIB(s) or SI message(s) (if any needed, e.g. RACH preambles and/or RACH time/frequency resources for request) are also included in minimum SI. The scheduling information in minimum SI includes an indicator which indicates whether the concerned SIB or SI message is being broadcasted or provided on demand. The scheduling information for the other SI includes SIB type, validity information, SI periodicity and SI-window information. The scheduling information for the other SI is provided irrespective of whether the other SI is being broadcasted or not. If minimum SI indicates that a SIB or SI message is not broadcasted (i.e. it is provided on demand), then the UE does not assume that this SIB or SI message is a broadcasted in its SI-window at every SI period. Therefore the UE may initiate on demand SI acquisition procedure i.e. send an SI request to receive this SIB or SI message.

For other SI provided on-demand, the UE can request one or more SIB(s) or all SIBs or SI message or SI messages in a single request. For idle and inactive mode, MSG1 or MSG3 can be used to transmit the SI request. The network controls whether MSG1 or MSG3 is used to transmit the SI request. If the PRACH preamble and/or PRACH resource specific to each SIB or set of SIBs which the UE needs to acquire is included in minimum SI then the SI request is indicated using MSG1. If the PRACH preamble and/or PRACH resource specific to each SIB or set of SIBs which the UE needs to acquire is not included in the minimum SI then the SI request is included in MSG3. The UE may also transition from idle or inactive state to connected state using connection setup procedure and send the SI request in dedicated RRC signaling.

After initiating the on demand SI acquisition procedure, the UE may fail to acquire desired SIB(s) or SI message(s). The failure can be because of one of the following reasons:

a) Failure to transmit the SI request successfully: After sending the SI request, gNB may send an acknowledgment indicating the SI request is received. The UE may retransmit the SI request if the UE does not receive acknowledgment. The SI request transmission can be declared as failed if the UE has not received acknowledgment even after transmitting the SI request for maximum number of retries.

In case the SI request is indicated using MSG1 i.e. PRACH preamble transmission, gNB sends an RAR indicating reception of PRACH preamble indicating the SI request. In this case RAR is acknowledgment from the network that the SI request is received. If RAR is not received successfully after transmitting PRACH preamble, the UE retransmit the PRACH preamble indicating the SI request. The SI request transmission can be declared as failed if the UE has not received RAR even after transmitting PRACH preamble indicating the SI request for maximum number of retries. In an embodiment RAR is successfully received if the RAR corresponds to both PRACH resource and RAPID used by the UE for PRACH preamble transmission. In an embodiment RAR is successfully received if the RAR corresponds to RAPID of PRACH preamble transmitted by the UE. In another embodiment RAR is successfully received if the RAR corresponds to PRACH resource used by the UE for PRACH preamble transmission. In an embodiment if the UE receives RAR scheduled using PDCCH addressed to its RA-RNTI (or reserved RNTI) and the received RAR indicates that at least the SIB(s) which the UE has requested will be transmitted or the network has received the request for them, then the UE can stop monitoring RAR in RAR window and consider RAR reception as successful. Note that RAR may include SIB(s) which the UE has not requested as well.

In case the SI request is indicated using MSG3, gNB sends an MSG4 indicating reception of the SI request. In this case MSG4 is acknowledgment from the network that the SI request is received. If MSG4 is not received successfully after transmitting MSG3, the UE retransmit the PRACH preamble or the MSG3 indicating the SI request. The SI request transmission can be declared as failed if the UE has not received MSG4 even after transmitting PRACH preamble or MSG3 indicating SI request for maximum number of retries. In an embodiment MSG4 is successfully received if the MSG4 includes the contents (at least the first X bytes of CCCH SDU transmitted in MSG3, X is pre-defined) of MSG3 sent by the UE. In another embodiment MSG4 is successfully received if the MSG4 includes at least the SI request message sent by the UE in MSG3 and the UE ID included in MSG3. In an embodiment if the UE receives MSG4 scheduled using PDCCH addressed to its T-CRNTI (i.e. temporary CRNTI provided to the UE in RAR) and the received MSG4 indicates that at least the SIB(s) which the UE has requested will be transmitted or the network has received the request for them, then the UE can start monitoring SI window according to scheduling information to acquire requested SIB(s). Note that MSG4 may include indication for additional SIB(s) apart from SIB(s) which the UE has requested in MSG3.

b) Failure to receive the SI transmitted by the network based on the UE's request: After transmitting the SI request or after receiving the acknowledgment for the SI request, the UE monitors the requested SIB(s) in SI window(s) according to scheduling information of one or more SI periods of requested SIB(s). If the UE fails to receive the requested SIB(s) UE may retransmit the SI request. SI reception can be declared as failed if the UE cannot receive even after transmitting the SI request successfully for maximum number of retries. Maximum number of retries can be pre-defined or signaled by the network in minimum SI.

c) Failure of random access procedure: Random access procedure can be used to transmit the SI request. If the UE fails to receive RAR during RAR window even after transmitting the PRACH preambles for fixed number of times (preambleTxMax) or contention resolution timer expires even after transmitting the PRACH preambles for fixed number of times (preambleTxMax), random access procedure failure or problem is declared. The parameter preambleTxMax is configured by the network. Upon detection of random access problem, the MAC entity in the UE indicates random access problem to higher layer (i.e. RRC). In an embodiment, in case the random access procedure was initiated for SI request, upon detection of random access problem, MAC entity also stops the ongoing random access procedure. In case the random access procedure was not initiated for SI request, upon detection of random access problem, MAC entity in UE does not stop the ongoing random access procedure. In another embodiment, in case the random access procedure was initiated for SI request, upon detection of random access problem, MAC entity indicates random access problem to higher layer (i.e. RRC). Upon receiving the random access problem indication from lower layer (i.e. MAC) and if UE is in RRC INACTIVE or RRC IDLE state and random access procedure was initiated for SI request (or RRC is waiting for acknowledgement for SI request from lower layers), RRC informs the lower layer (i.e. MAC) to stop the ongoing random access procedure. In another embodiment, in case the random access procedure was initiated for SI request, upon detection of random access problem, MAC entity indicates random access problem to higher layer (i.e. RRC). Upon receiving the random access problem indication from lower layer (i.e. MAC) and if random access procedure was initiated for SI request (or RRC is waiting for acknowledgement for SI request from lower layers), RRC informs the lower layer (i.e. MAC) to stop the ongoing random access procedure.

d) Failure to setup connection (connection setup timer expires).

Figure 3:
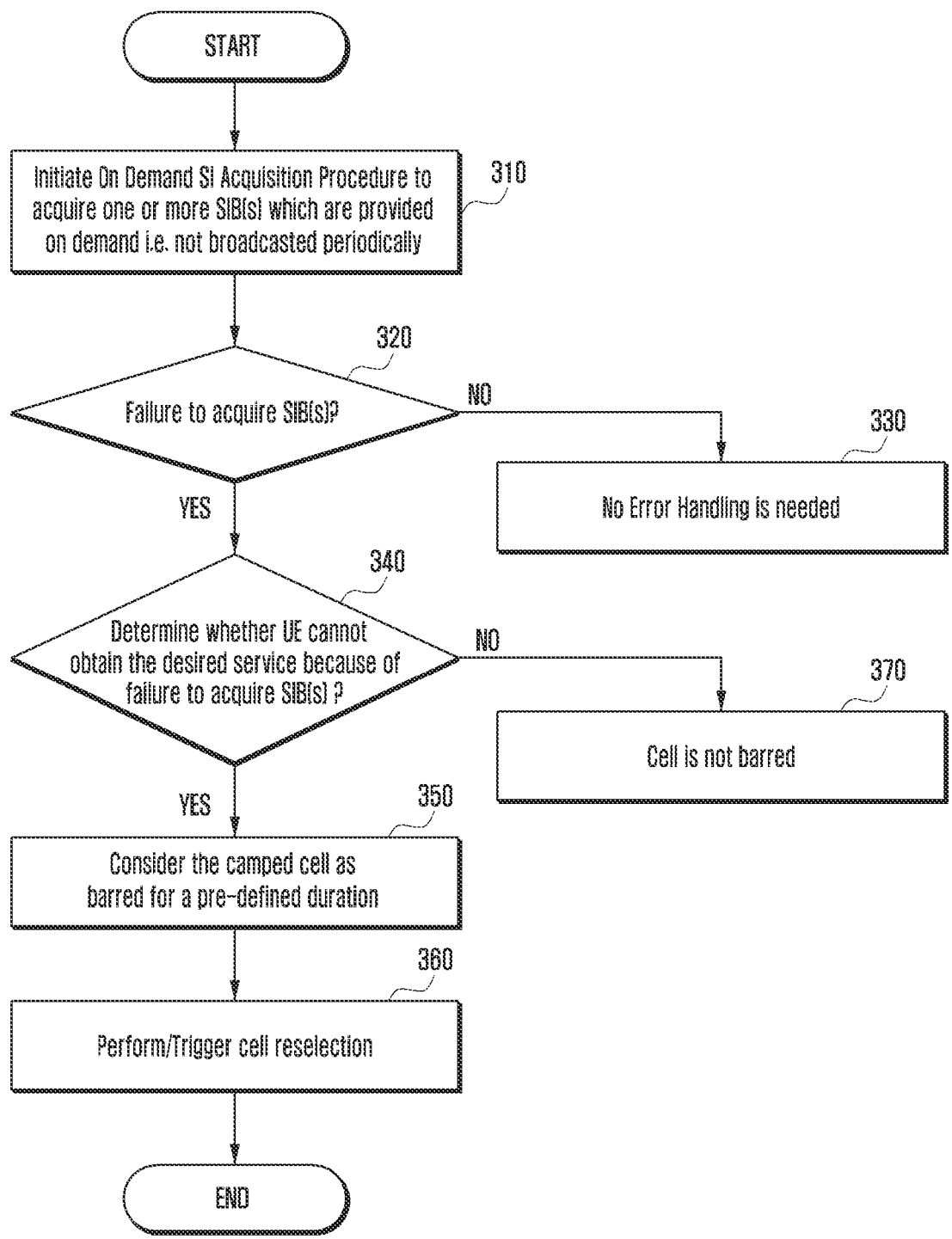
FIG. 3 illustrates a method for on demand SI acquisition error handling according to an embodiment of the disclosure.

FIG. 3 illustrates a method for on demand SI acquisition error handling according to an embodiment of the disclosure.

Referring to FIG. 3, similar to Embodiments 1 and 2, the UE (in idle/inactive state) initiates on demand SI acquisition procedure to acquire one or more SIB(s) or SI message(s) which are provided on demand, i.e. not being broadcasted at operation 310. The UE determines whether there is a failure to acquire desired SIB(s) or SI message(s) at operation 320. The various ways to determine failure are explained earlier in the invention. If the UE acquires the desired SIB(s) or SI message(s) successfully using on demand SI acquisition procedure, no error handling is needed at operation 330. However, if the UE fails to acquire the desired SIB(s) or SI message(s) using on demand SI acquisition procedure, the UE determines whether the UE cannot obtain the desired service because of failure to acquire SIB(s) at operation 340. Some of the SIB(s) are mapped to specific services. For example there can be SIBs(s) which are needed for multimedia broadcast multicast services (MBMS) services, there can be the SIB(s) which are needed for device-to-device (D2D) services, and there can be the SIB which is needed for vehicle-to-vehicle (V2V) services and so on. If the UE is interested in a service (e.g. MBMS or D2D or V2V) and is not able to acquire the corresponding SIB(s) then the UE cannot obtain those services. If the UE cannot obtain the desired service because of failure to acquire SIB(s), then the UE shall declare SI acquisition failure and start the pre-defined timer. While the timer is running, the UE considers the camped cell as barred for pre-defined duration at operation 350. The UE may performs/trigger cell reselection if another suitable cell is found while the timer is running at operation 360. The UE also re-try the SI request on the camped cell upon expiry of the timer. If the UE can obtain the desired service despite of failure to acquire SIB(s), the UE does not consider the camped cell as barred at operation 370.

Embodiment 4

The system information is divided into minimum SI and other SI. Minimum SI is periodically broadcast. Minimum SI may comprise of MIB and one or more SIBs. Other SI can be broadcasted or provided on-demand based on the UE request. The minimum SI comprises basic information required for initial access to a cell and information for acquiring any other SI broadcast periodically or provisioned via on-demand basis. The minimum SI includes at least SFN, list of PLMN, cell ID, cell camping parameters, and RACH parameters. If the network allows the on demand mechanism, parameters required for requesting other SIB(s) or SI message(s) (if any needed, e.g. RACH preambles for request and/or RACH time/frequency resources) are also included in minimum SI. The scheduling information in minimum SI includes an indicator which indicates whether the concerned SIB or SI message is being broadcasted or provided on demand. The scheduling information for the other SI includes SIB type, validity information, SI periodicity and SI-window information. The scheduling information for the other SI is provided irrespective of whether the other SI is being broadcasted or not. If minimum SI indicates that a SIB or SI message is not broadcasted (i.e. it is provided on demand), then the UE does not assume that this SIB or SI message is a broadcasted in its SI-window at every SI period. Therefore the UE may initiate on demand SI acquisition procedure i.e. send an SI request to receive this SIB or SI message.

For other SI provided on-demand, the UE can request one or more SIB(s) or all SIBs or SI message or SI messages in a single request. For idle and inactive mode, MSG1 or MSG3 can be used to transmit the SI request. The network controls whether MSG1 or MSG3 is used to transmit the SI request. If the PRACH preamble and/or PRACH resource specific to each SIB or set of SIBs which the UE needs to acquire is included in minimum SI then the SI request is indicated using MSG1. If the PRACH preamble and/or PRACH resource specific to each SIB or set of SIBs which the UE needs to acquire is not included in the minimum SI then the SI request is included in MSG3. The UE may also transition from idle or inactive state to connected state using connection setup procedure and send the SI request in dedicated RRC signaling.

After initiating the on demand SI acquisition procedure, the UE may fail to acquire desired SIB(s) or SI message(s). The failure can be because of one of the following reasons:

a) Failure to transmit the SI request successfully: After sending the SI request, gNB may send an acknowledgment indicating the SI request is received. The UE may retransmit the SI request if the UE does not receive acknowledgment. The SI request transmission can be declared as failed if the UE has not received acknowledgment even after transmitting the SI request for maximum number of retries.

In case the SI request is indicated using MSG1 i.e. PRACH preamble transmission, gNB sends an RAR indicating reception of PRACH preamble indicating the SI request. In this case RAR is acknowledgment from the network that the SI request is received. If RAR is not received successfully after transmitting PRACH preamble, the UE retransmit the PRACH preamble indicating the SI request. The SI request transmission can be declared as failed if the UE has not received RAR even after transmitting PRACH preamble indicating the SI request for maximum number of retries. In an embodiment RAR is successfully received if the RAR corresponds to both PRACH resource and RAPID used by the UE for PRACH preamble transmission. In an embodiment RAR is successfully received if the RAR corresponds to RAPID of PRACH preamble transmitted by the UE. In another embodiment RAR is successfully received if the RAR corresponds to PRACH resource used by the UE for PRACH preamble transmission. In an embodiment if the UE receives RAR scheduled using PDCCH addressed to its RA-RNTI (or reserved RNTI) and the received RAR indicates that at least the SIB(s) which the UE has requested will be transmitted or the network has received the request for them, then the UE can stop monitoring RAR in RAR window and consider RAR reception as successful. Note that RAR may include SIB(s) which the UE has not requested as well.

In case the SI request is indicated using MSG3, gNB sends an MSG4 indicating reception of the SI request. In this case MSG4 is acknowledgment from the network that the SI request is received. If MSG4 is not received successfully after transmitting MSG3, the UE retransmit the PRACH preamble or the MSG3 indicating the SI request. The SI request transmission can be declared as failed if the UE has not received MSG4 even after transmitting PRACH preamble or MSG3 indicating the SI request for maximum number of retries. In an embodiment MSG4 is successfully received if the MSG4 includes the contents (at least the first X bytes of CCCH SDU transmitted in MSG3, X is pre-defined) of MSG3 sent by the UE. In another embodiment MSG4 is successfully received if the MSG4 includes at least the SI request message sent by the UE in MSG3 and the UE ID included in MSG3. In an embodiment if the UE receives MSG4 scheduled using PDCCH addressed to its T-CRNTI (i.e. temporary CRNTI provided to the UE in RAR) and the received MSG4 indicates that at least the SIB(s) which the UE has requested will be transmitted or the network has received the request for them, then the UE can start monitoring SI window according to scheduling information to acquire requested SIB(s). Note that MSG4 may include indication for additional SIB(s) apart from SIB(s) which the UE has requested in MSG3.

b) Failure to receive the SI transmitted by the network based on the UE's request: After transmitting the SI request or after receiving the acknowledgment for the SI request, the UE monitors the requested SIB(s) in SI window(s) according to scheduling information of one or more SI periods of requested SIB(s). If the UE fails to receive the requested SIB(s) UE may retransmit the SI request. SI reception can be declared as failed if the UE cannot receive even after transmitting the SI request successfully for maximum number of retries. Maximum number of retries can be pre-defined or signaled by the network in minimum SI.

c) Failure of random access procedure: Random access procedure can be used to transmit the SI request. If the UE fails to receive RAR during RAR window even after transmitting the PRACH preambles for fixed number of times (preambleTxMax) or contention resolution timer expires even after transmitting the PRACH preambles for fixed number of times (preambleTxMax), random access procedure failure or problem is declared. The parameter preambleTxMax is configured by the network. Upon detection of random access problem, the MAC entity in the UE indicates random access problem to higher layer (i.e. RRC). In an embodiment, in case the random access procedure was initiated for SI request, upon detection of random access problem, MAC entity also stops the ongoing random access procedure. In case the random access procedure was not initiated for SI request, upon detection of random access problem, MAC entity in UE does not stop the ongoing random access procedure. In another embodiment, in case the random access procedure was initiated for SI request, upon detection of random access problem, MAC entity indicates random access problem to higher layer (i.e. RRC). Upon receiving the random access problem indication from lower layer (i.e. MAC) and if UE is in RRC INACTIVE or RRC IDLE state and random access procedure was initiated for SI request (or RRC is waiting for acknowledgement for SI request from lower layers), RRC informs the lower layer (i.e. MAC) to stop the ongoing random access procedure. In another embodiment, in case the random access procedure was initiated for SI request, upon detection of random access problem, MAC entity indicates random access problem to higher layer (i.e. RRC). Upon receiving the random access problem indication from lower layer (i.e. MAC) and if random access procedure was initiated for SI request (or RRC is waiting for acknowledgement for SI request from lower layers), RRC informs the lower layer (i.e. MAC) to stop the ongoing random access procedure.

d) Failure to setup connection (connection setup timer expires).

Figure 4:
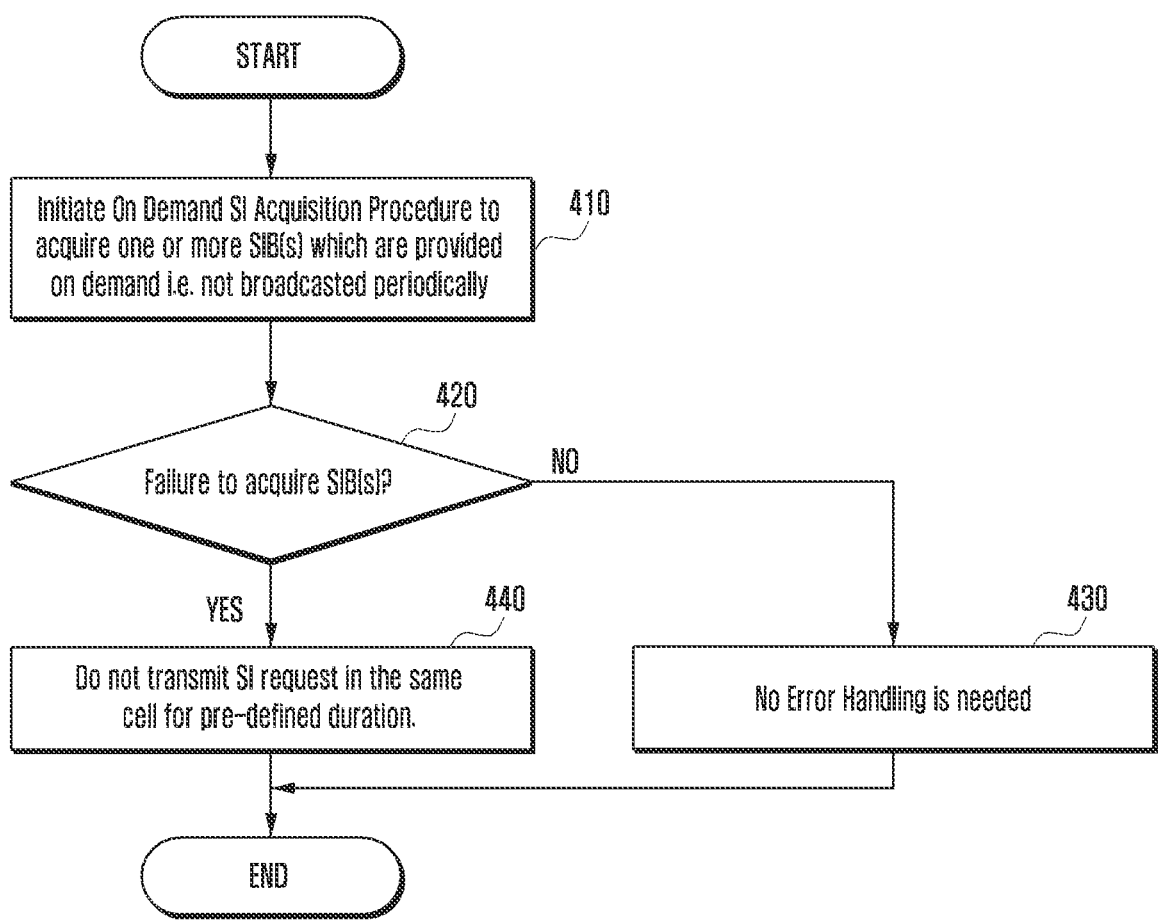
FIG. 4 illustrates a method for on demand SI acquisition error handling according to an embodiment of the disclosure.

FIG. 4 illustrates a method for on demand SI acquisition error handling according to an embodiment of the disclosure.

Referring to FIG. 4, similar to Embodiments 1, 2 and 3, the UE (in idle/inactive state) initiates on demand SI acquisition procedure to acquire one or more SIB(s) or SI message(s) which are provided on demand, i.e. not being broadcasted at operation 410. The UE determines whether there is a failure to acquire desired SIB(s) or SI message(s) at operation 420. The various ways to determine failure are explained earlier in the invention. If the UE acquires the desired SIB(s) or SI message(s) successfully using on demand SI acquisition procedure, no error handling is needed at operation 430. However, if the UE fails to acquire the desired SIB(s) or SI message(s) using on demand SI acquisition procedure, the UE determines whether the UE cannot obtain the desired essential SIB(s) and/or desired service because of failure to acquire corresponding SIB(s). If the UE cannot obtain the essential SIB(s) and/or desired service because of failure to acquire SIB(s), then the UE shall declare SI acquisition failure and start the timer for a pre-defined time. The timer value can also be configured by the network using broadcast (e.g. system information) or dedicated (e.g. reconfiguration message) RRC signaling. The UE refrains from transmitting the SI request when the timer is running and may re-try again upon expiry of the pre-defined timer at operation 440. In an embodiment, The UE may also perform/trigger cell reselection if another suitable cell is found while the timer is running.

In the idle/inactive state, if the SI request transmission is not successful even after transmitting the SI request for maximum number of retries (or if the UE has initiated the SI request and random access failure is declared by media access control (MAC)), the UE may consider the camped cell as unsuitable and perform/trigger cell re-selection. The UE may also consider the camped cell as barred cell for a pre-defined duration.

In an alternate embodiment, if the SI request transmission is not successful even after transmitting the SI request for maximum number of retries (or if the UE has initiated the SI request and random access failure is declared by MAC), and if the UE is not able to obtain the desired service from camped cell because of a lack of system information which the UE has requested in the SI request, the UE may consider the camped cell as unsuitable and perform/trigger cell reselection. The UE may also consider the camped cell as barred cell for a pre-defined duration.

In an alternate embodiment, if the SI request transmission is not successful even after transmitting the SI request for maximum number of retries (or if the UE has initiated the SI request and random access failure is declared by MAC), the UE shall not transmit the SI request in the same cell for pre-defined duration. The duration can also be configured by the network using broadcast (e.g. system information) or dedicated (e.g. reconfiguration message) RRC signaling.

RA Backoff Mechanism

During the random access procedure, the UE first transmits the PRACH preamble and then waits for RAR in the RAR window corresponding to its RACH preamble transmission. Sometimes due to congestion on PRACH channel, PRACH preamble transmission may not be successful. In the current system, in such a situation the network sends RAR with backoff indicator/index. The UE then backoff i.e. the UE retransmits PRACH preamble after a time period which is randomly selected between 0 and backoff value. The backoff value is obtained by the UE from a backoff table corresponding to backoff index received in RAR. All the UEs perform backoff in similar manner. This is not efficient as latency requirement may be different for different UEs. The latency requirement may be different depending on event which triggered random access procedure and so on. So RA backoff mechanism needs to be enhanced.

Embodiment 1

In one embodiment of the disclosure, backoff parameter for random access is specified for each access category. There can be several access categories. An access category corresponds to a UE/device type and/or a service type and/or a call type and/or a signaling type and/or an application ID and/or a slice type and/or a slice ID and/or combination of one or more of the UE/device type, the service type, the call type, the signaling type or the application type or the slice type or the slice ID.

Figure 5:
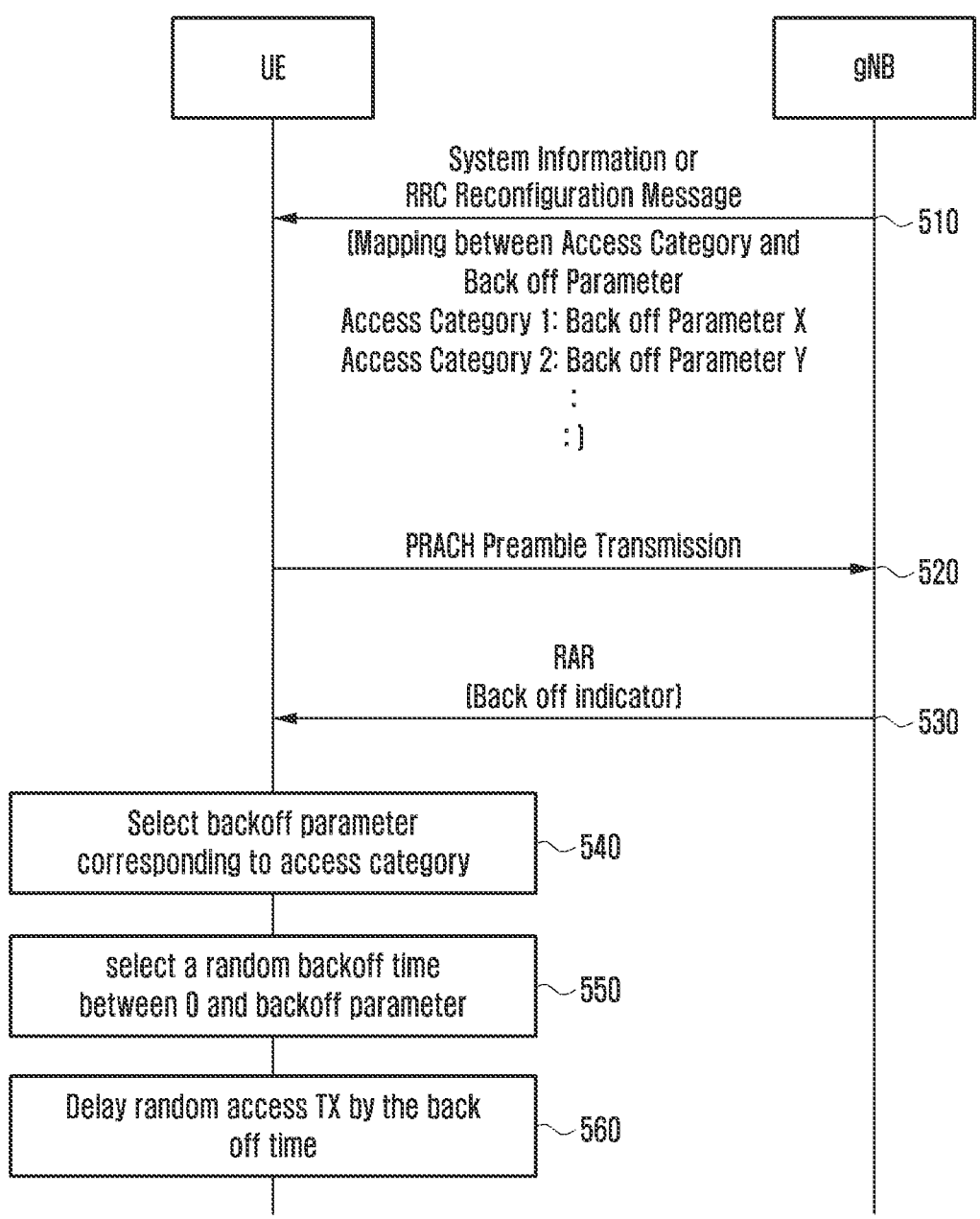
FIG. 5 illustrates an operation for random access (RA) backoff according to an embodiment of the disclosure.

FIG. 5 illustrates an operation for RA backoff according to an embodiment of the disclosure.

Referring to FIG. 5, the mapping between backoff parameter value and access category is signaled (either using periodic broadcast or on demand) by network (i.e. gNB) in SI at operation 510. For example, gNB may transmit the system information indicating that Backoff Parameter value for Access Category 1 is X, Backoff Parameter value for Access Category 2 is Y, and so on. The mapping between backoff parameter value and access category can also be signaled in dedicated RRC signaling (e.g. RRC Reconfiguration message). During the random access procedure, the UE transmits a PRACH preamble at operation 520, and then waits for RAR in the RAR window corresponding to its RACH preamble transmission.

If the network (e.g. gNB) wants the UE to back off the network sends a backoff indicator in RAR at operation 530. The backoff indicator may be one bit. If the UE receives backoff indicator in RAR, the UE sets backoff parameter value corresponding to access category at operation 540. The access category may correspond to the access category of the UE or the access category for which the UE is accessing the cell or the access category for which the UE is performing random access. In another embodiment, after transmitting the PRACH preamble 'N' times, the UE performs backoff. 'N' can be pre-defined or signaled (either using periodic broadcast or on demand or in dedicated RRC signaling) in SI. The UE sets backoff parameter value corresponding to access category (the access category of the UE or the access category for which the UE is accessing the cell or the access category for which the UE is performing random access).

Based on the determined backoff parameter value, if the transmitted Random Access Preamble at operation 520 was selected among the contention-based Random Access Preambles, the UE selects a random backoff time according to a uniform distribution between 0 and the backoff parameter value at operation 550. The UE then delays the subsequent random access transmission by the selected backoff time at operation 560.

Embodiment 2

In another embodiment of the disclosure, backoff parameter for random access is specified for each access priority.

Figure 6:
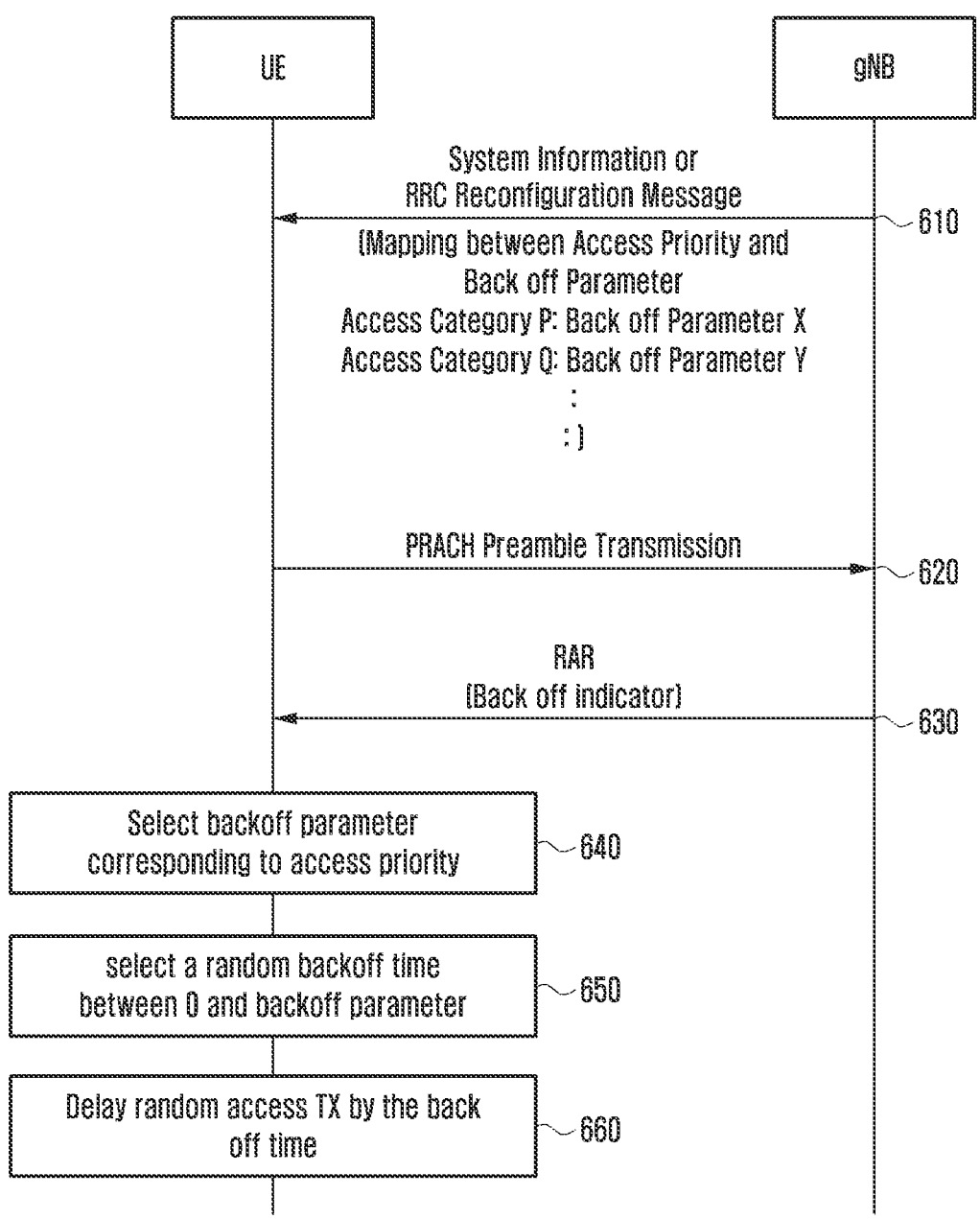
FIG. 6 illustrates an operation for RA backoff according to an embodiment of the disclosure.

FIG. 6 illustrates an operation for RA backoff according to an embodiment of the disclosure.

Referring to FIG. 6, the mapping between backoff parameter value and access priority is signaled (either using periodic broadcast or on demand) by network (i.e. gNB) in SI at operation 610. For example, gNB may transmit the system information indicating that Backoff Parameter value for Random Access Priority 1 is X, Backoff Parameter value for Random Access Priority 2 is Y, and so on. The mapping between backoff parameter value and random access priority can also be signaled in dedicated RRC signaling (e.g. RRC Reconfiguration message). In an embodiment, there can be just two access priorities, high priority and low (or normal priority). Network signals the backoff parameter values for high priority random access and normal random access in system information and/or in dedicated RRC signaling. During the random access procedure, the UE transmits PRACH preamble at operation 620, and then waits for RAR in the RAR window corresponding to its RACH preamble transmission.

If the network (e.g. gNB) wants the UE to back off the network sends a backoff indicator in RAR at operation 630. The backoff indicator may be one bit. In an embodiment, if the UE receives backoff indicator in RAR, the UE sets backoff parameter value (if configured) corresponding to access priority of the random access procedure at operation 640. If the backoff parameter value corresponding to access priority of the random access procedure is not configured, UE sets backoff parameter value corresponding to normal random access. In another embodiment, after transmitting PRACH preamble 'N' times, the UE performs backoff. 'N' can be pre-defined or signaled (either using periodic broadcast or on demand or in dedicated RRC signaling) in SI. The UE sets backoff parameter value (if configured) corresponding to access priority of the random access procedure. If the backoff parameter value corresponding to access priority of the random access procedure is not configured, UE sets backoff parameter value corresponding to normal random access.

Based on the determined backoff parameter, if the transmitted Random Access Preamble at operation 620 was selected among the contention-based Random Access Preambles, the UE select a random backoff time according to a uniform distribution between 0 and the backoff parameter value at operation 650. The UE then delays the subsequent random access transmission by the selected backoff time at operation 660.

If the random access procedure is initiated for uplink (UL) data transmission corresponding to a logical channel, then in one embodiment access priority of random access procedure for determining the backoff parameter value is the priority of that logical channel. The priority for each logical channel is configured by the network and signaled to the UE in dedicated RRC signaling. If the random access procedure is initiated for UL data transmission corresponding to a numerology, then in another embodiment access priority of random access procedure for determining the backoff parameter value is the priority of that numerology. The priority for each numerology is configured by the network and signaled to the UE in dedicated RRC signaling or broadcast signaling. If the random access procedure is initiated for UL data transmission corresponding to a transmission time interval (TTI) duration, then in one embodiment access priority of random access procedure for determining the backoff parameter value is the priority of that TTI duration. The priority for each TTI duration is configured by the network and signaled to the UE in dedicated RRC signaling or broadcast signaling. In an embodiment, the network may signal random access priority (random access priority can be pre-defined) for various events such as handover, UL data transmission, initial access, UL synchronization, on-demand SI request, initial RACH transmission, RACH retransmission, beam failure recovery, etc. In an embodiment, wherein only two random access priorities are configured, the network may indicate one or more events (such as handover, UL data transmission, initial access, UL synchronization, on-demand SI request, initial RACH transmission, RACH retransmission, beam failure recovery, etc.) for which high random access priority is applied. Alternately, the one or more events (e.g. handover, beam failure recovery, etc.) for which high random access priority is applied are pre-defined. The UE selects the backoff parameter value corresponding to priority of event for which the UE is performing random access. In an embodiment, if handover is a high priority random access event and backoff parameter for high priority random access event (i.e. handover) is configured in dedicated RRC signaling or in SI, UE selects the backoff parameter value corresponding to high priority random access event. If handover is a high priority random access event and backoff parameter for high priority random access event (i e handover) is not configured, UE selects the backoff parameter value corresponding to normal random access. The backoff parameter value corresponding to normal random access can be signaled in dedicated RRC signaling or in SI. In another embodiment, if beam failure recovery is a high priority random access event and backoff parameter for high priority random access event (i.e. beam failure recovery) is configured in dedicated RRC signaling or in SI, UE selects the backoff parameter value corresponding to high priority random access event (i.e. beam failure recovery). If beam failure recovery is a high priority random access event and backoff parameter for high priority random access event (i.e. beam failure recovery) is not configured, UE selects the backoff parameter value corresponding to normal random access. The backoff parameter value corresponding to normal random access can be signaled in dedicated RRC signaling or in SI. In an embodiment, the network may signal priority (or priority can be pre-defined) for various services such as ultra-reliable and low-latency communication (URLLC), enhanced Mobile broadband (eMBB), machine type communication (MTC), vehicle to everything (V2X), D2D, etc. The UE selects the backoff parameter value corresponding to priority of service for which the UE is performing random access. In an embodiment, the network may signal priority for various slices (slice type or slice IDs). The UE selects the backoff parameter value corresponding to priority of slice for which the UE is performing random access.

Embodiment 3

In one embodiment of the disclosure, a scaling factor for random access backoff is specified for each access category. If scaling factor is not specified for an access category, a default scaling factor (e.g. 1) can be used.

Figure 7:
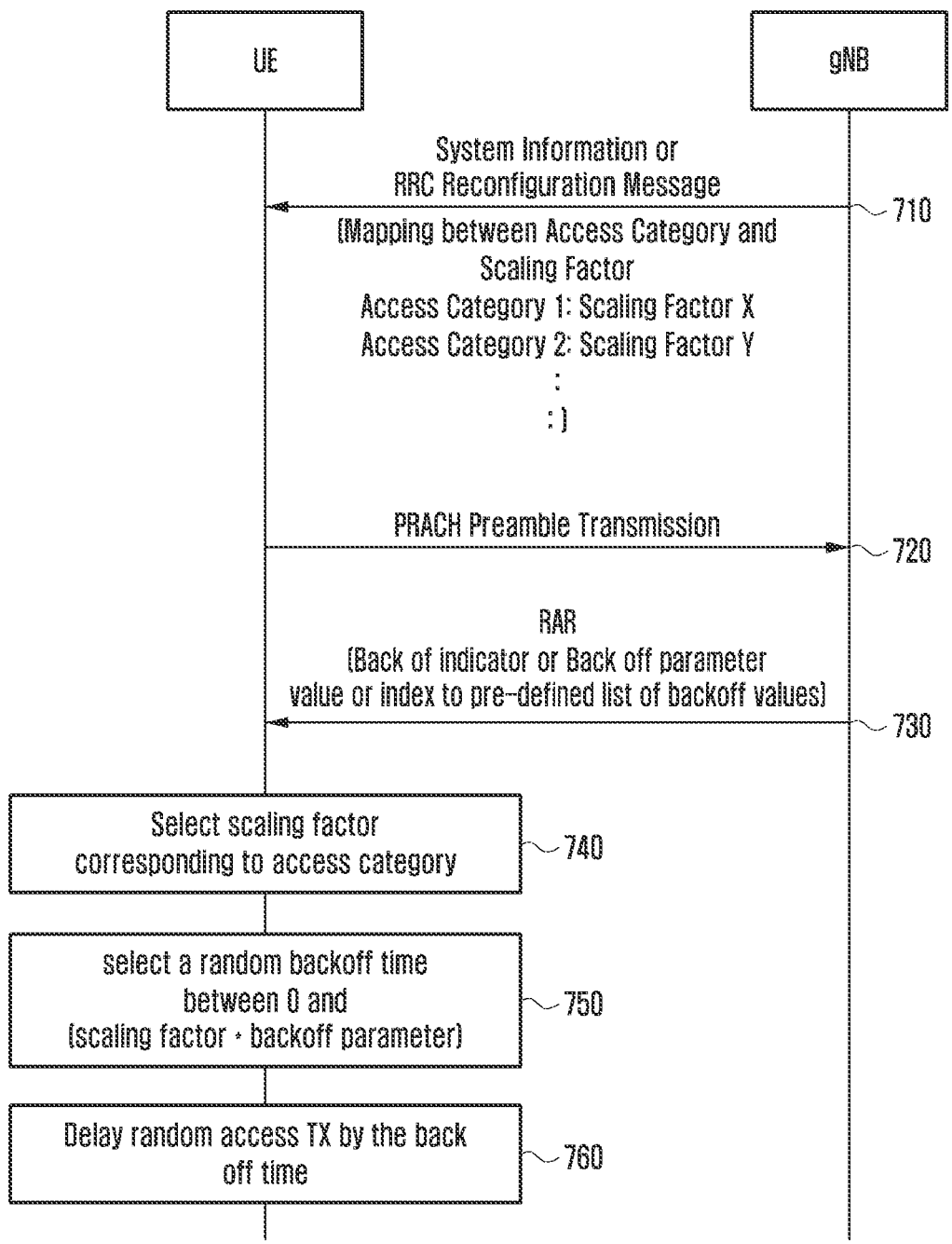
FIG. 7 illustrates an operation for RA backoff according to an embodiment of the disclosure.

FIG. 7 illustrates an operation for RA backoff according to an embodiment of the disclosure.

Referring to FIG. 7, the mapping between backoff scaling factor and access category is signaled (either using periodic broadcast or on demand) by network (e.g. gNB) in SI at operation 710. For example, gNB may transmit system information indicating that Backoff Scaling Factor for Access Category 1 is Scaling Factor X, Backoff Scaling Factor for Access Category 2 is Scaling Factor Y, and so on. The mapping between Backoff Scaling Factor and access category can also be signaled in dedicated RRC signaling (e.g. RRC Reconfiguration message). In another embodiment, the mapping between scaling factor and access category can be pre-defined. There can be several access categories. An access category corresponds to a UE/device type and/or service type and/or call type and/or signaling type and/or application ID and/or slice type and/or slice ID and/or combination of one or more of UE/device type, service type, call type, signaling type or application type or slice type or slice ID. If backoff scaling factor is not specified for an access category, a default backoff scaling factor (e.g. 1) can be used. In an embodiment, there can be just two access categories, high access category and low (or normal access category). In this case the backoff scaling factor may be signaled in system information or in dedicated RRC signaling only for high access category. The backoff scaling factor for low (or normal access category) access category is 1 (i.e. no backoff scaling is applied).

Similar to Embodiments 1 and 2, during the random access procedure, the UE transmits PRACH preamble at operation 720, and then waits for RAR in the RAR window corresponding to its RACH preamble transmission.

If the network (e.g. gNB) wants the UE to back off the network sends backoff parameter value (or index to pre-defined list of backoff values) in RAR at operation 730. Alternately, if the network wants the UE to back off the network sends backoff indicator at operation 730, and backoff parameter is pre-defined or signaled in SI. If the UE receives backoff parameter value (or index to predefined list of backoff values) or indication to backoff in RAR, the UE sets backoff scaling factor corresponding to access category at operation 740. The access category may correspond to the access category of the UE or the access category for which the UE is accessing the cell or the access category for which the UE is performing random access. In another embodiment, after transmitting PRACH preamble 'N' times, the UE performs backoff. 'N' can be pre-defined or signaled (either using periodic broadcast or on demand or dedicated RRC signaling) in SI. The UE sets backoff scaling factor corresponding to access category (i.e. the access category of the UE or the access category for which the UE is accessing the cell or the access category for which the UE is performing random access). Backoff parameter is pre-defined or signaled in SI in this case.

Based on the determined backoff scaling factor, if the transmitted Random Access Preamble at operation 720 was selected among the contention-based Random Access Preambles, the UE select a random backoff time according to a uniform distribution between 0 and the 'scaling factor*Backoff Parameter Value' at operation 750. The UE then delays the subsequent Random Access transmission by the backoff time at operation 760.

Embodiment 4

In another embodiment of the disclosure, scaling factor for random access backoff is specified for each access priority.

Figure 8:
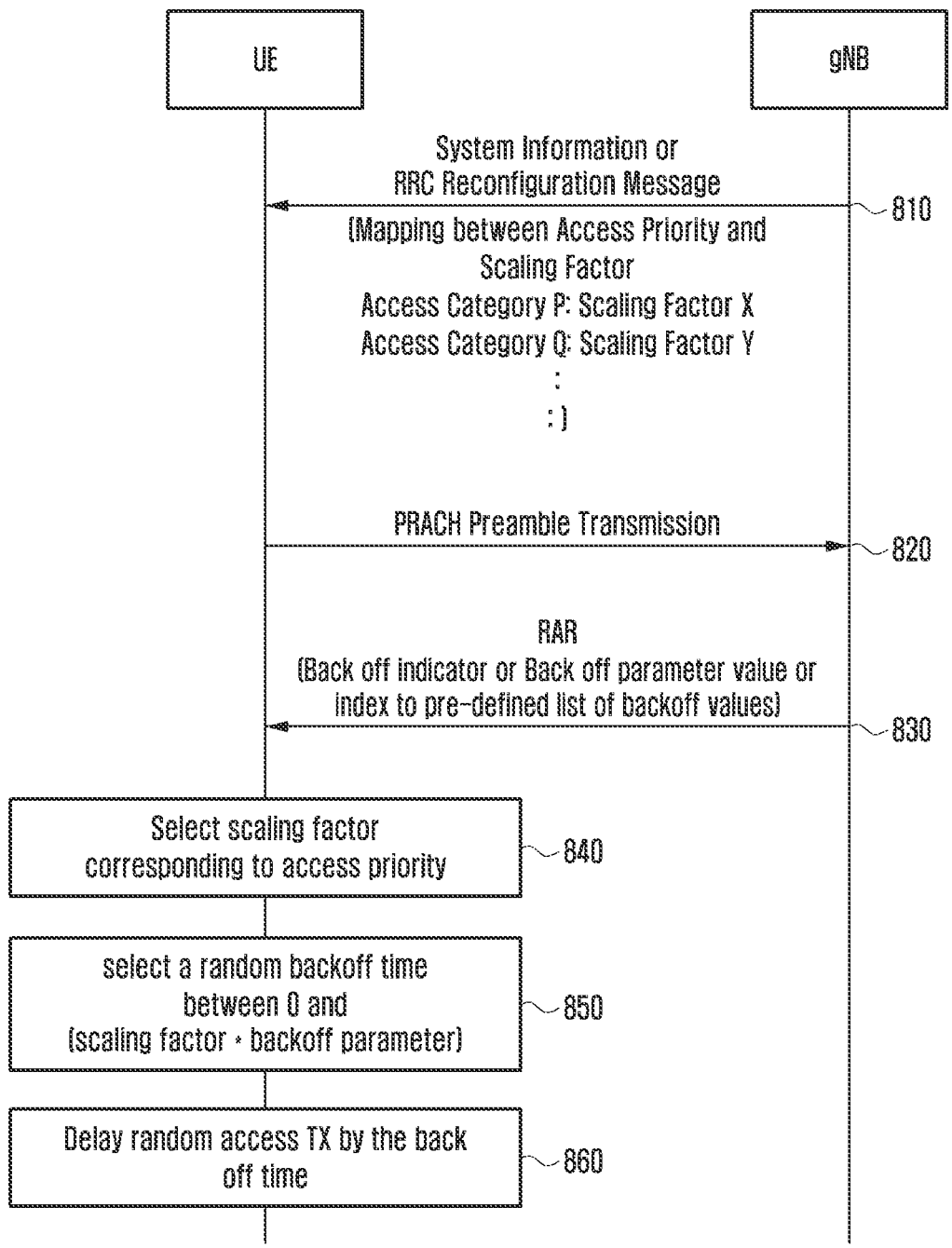
FIG. 8 illustrates an operation for RA backoff according to an embodiment of the disclosure.

FIG. 8 illustrates an operation for RA backoff according to an embodiment of the disclosure.

Referring to FIG. 8, the mapping between backoff scaling factor and access priority is signaled (either using periodic broadcast or on demand) by network (e.g. gNB) in SI at operation 810. For example, gNB may transmit system information indicating that Backoff Scaling Factor for Random Access Priority 1 is Scaling Factor X, Backoff Scaling Factor for Random Access Priority 2 is Scaling Factor Y, and so on. The mapping between Backoff Scaling Factor and Random access Priority can also be signaled in dedicated RRC signaling (e.g. RRC Reconfiguration message). In another embodiment, the mapping between backoff scaling factor and random access priority can be pre-defined. If backoff scaling factor is not specified for a random access priority, a default backoff scaling factor (e.g. 1) can be used. In an embodiment, there can be just two random access priorities, high priority and low (or normal priority). In this case the backoff scaling factor may be signaled in system information or in dedicated RRC signaling only for high priority random access. The backoff scaling factor for low (or normal priority) priority random access is 1 (i.e. no backoff scaling is applied).

Similar to Embodiments 1, 2 and 3, during the random access procedure, the UE transmits a PRACH preamble at operation 820, and then waits for RAR in the RAR window corresponding to its RACH preamble transmission. If the network (e.g. gNB) wants the UE to back off the network sends backoff parameter value (or index to predefined list of backoff values) in RAR at operation 830. Alternately, if the network wants the UE to back off the network sends backoff indicator at operation 830, and backoff parameter is pre-defined or signaled in SI. If the UE receives backoff parameter value (or index to predefined list of backoff values) or indication to backoff in RAR, the UE sets backoff scaling factor corresponding to access priority of random access procedure at operation 840. In another embodiment, after transmitting the PRACH preamble 'N' times, the UE performs backoff. 'N' can be pre-defined or signaled (either using periodic broadcast or on demand) in SI or in dedicated RRC signaling. The UE sets backoff scaling factor corresponding to access priority of random access procedure. Backoff parameter is pre-defined or signaled in SI in this case.

Based on the determined scaling factor, if the transmitted Random Access Preamble at operation 820 was selected among the contention-based Random Access Preambles, the UE select a random backoff time according to a uniform distribution between 0 and the 'Scaling factor*Backoff Parameter Value' at operation 850. The UE then delays the subsequent random access transmission by the backoff time at operation 860.

In an alternate embodiment, if the Random Access procedure is initiated for handover (or upon reception of reconfiguration message including reconfigurationwithSync IE) or beam failure recovery and Backoff Scaling Factor is configured by network: UE select a random backoff time according to a uniform distribution between 0 and the value of the 'Backoff Scaling Factor*Backoff Parameter Value' at operation 850. Otherwise, UE select a random backoff time according to a uniform distribution between 0 and the value of the 'Backoff Parameter Value' at operation 850.

If the random access procedure is initiated for UL data transmission corresponding to a logical channel, then in one embodiment access priority of the random access procedure is the priority of that logical channel. The priority for each logical channel is configured by the network and signaled to the UE in dedicated RRC signaling. If the random access procedure is initiated for UL data transmission corresponding to a numerology, then in another embodiment access priority of the random access procedure is the priority of that numerology. The priority for each numerology is configured by network and signaled to the UE in dedicated RRC signaling or broadcast signaling. If the random access procedure is initiated for UL data transmission corresponding to a TTI duration, then in one embodiment access priority of the random access procedure is the priority of that TTI duration. The priority for each TTI duration is configured by the network and signaled to the UE in dedicated RRC signaling or broadcast signaling. In an embodiment, the network may signal random access priority (or random access priority can be pre-defined) for various events such as handover, UL data transmission, initial access, UL synchronization, on-demand SI request, initial RACH transmission, RACH retransmission, beam failure recovery, etc. In an embodiment, wherein only two random access priorities are configured, the network may indicate one or more events (such as handover, UL data transmission, initial access, UL synchronization, on-demand SI request, initial RACH transmission, RACH retransmission, beam failure recovery, etc.) for which high random access priority is applied. Alternately, the one or more events (e g handover, beam failure recovery, etc.) for which high random access priority is applied are pre-defined. The UE selects the backoff scaling factor corresponding to random access priority of event for which the UE is performing random access. In an embodiment, if handover (or random access triggered by reception of reconfiguration message including reconfigurationwith-Sync IE) is a high priority random access event and backoff scaling factor for high priority random access event (i.e. handover) is configured, UE selects the configured backoff scaling factor. The backoff scaling factor for high priority random access event or handover (or random access triggered by reception of reconfiguration message including reconfigurationwithSync IE) can be signaled in dedicated RRC signaling or in SI. If handover is a high priority random access event and backoff scaling factor for high priority random access event (i e handover) is not configured, UE selects the backoff scaling factor equal to 1. In another embodiment, if beam failure recovery is a high priority random access event and backoff scaling factor for high priority random access event (i.e. beam failure recovery) is configured, UE selects the configured backoff scaling factor. The backoff scaling factor for high priority random access event or beam failure recovery can be signaled in dedicated RRC signaling or in SI. If beam failure recovery is a high priority random access event and backoff scaling factor for high priority random access event (i.e. beam failure recovery) is not configured, UE selects the backoff scaling factor equal to 1. In an embodiment, the network may signal random access priority (or random access priority can be pre-defined) for various services such as URLLC, eMBB, MTC, V2X, D2D, etc. The UE selects the backoff scaling factor corresponding to priority of service for which the UE is performing random access. In an embodiment, the network may signal priority (or priority can be pre-defined) for various slices (slice type or slice IDs). The UE selects the backoff scaling factor corresponding to priority of slice for which the UE is performing random access.

Embodiment 5

In another embodiment of the disclosure, scaling factor for random access backoff is specified corresponding to retransmission attempt number (or based PREAMBLE_TRANSMISSION_COUNTER).

Figure 9:
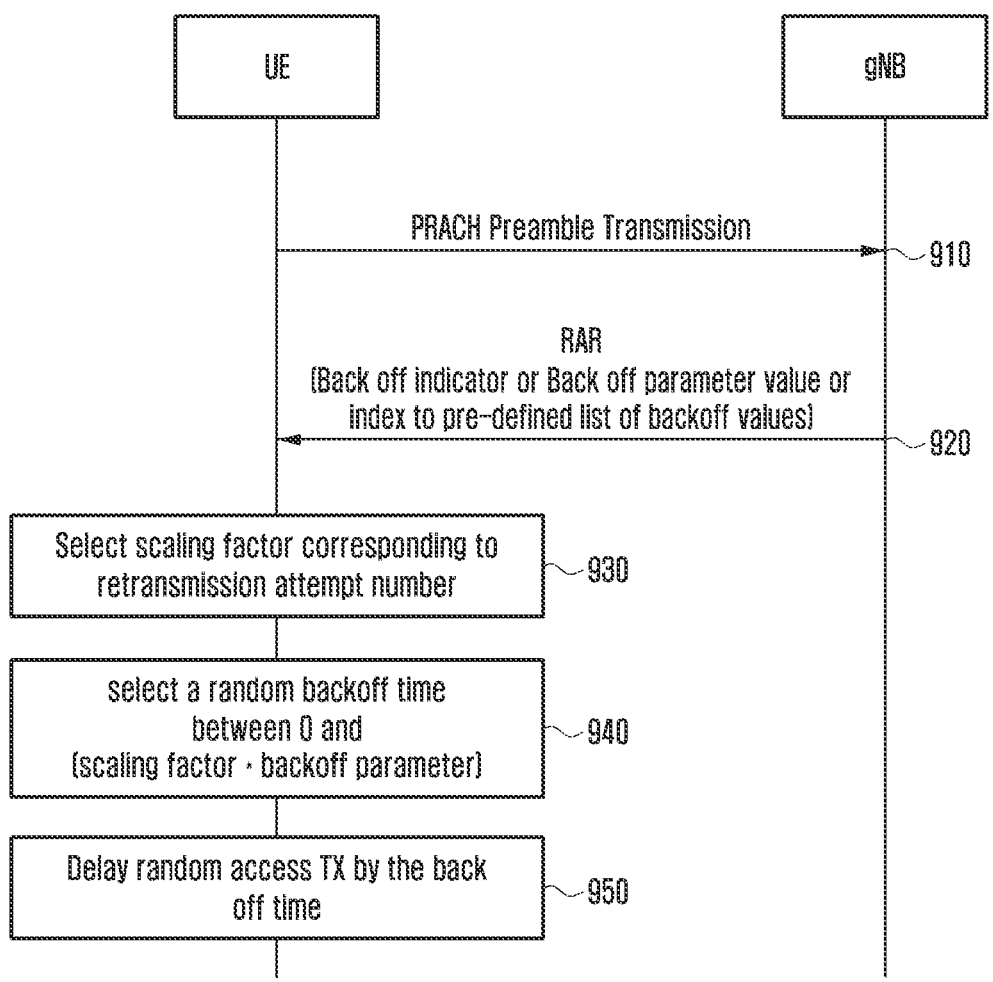
FIG. 9 illustrates an operation for RA backoff according to an embodiment of the disclosure.

FIG. 9 illustrates an operation for RA backoff according to an embodiment of the disclosure.

Similar to Embodiments 1 to 4, during the random access procedure, the UE transmits a PRACH preamble at operation 910, and then waits for RAR in the RAR window corresponding to its RACH preamble transmission. If the network (e.g. gNB) wants the UE to back off the network sends backoff parameter value (or index to predefined list of backoff values) in RAR at operation 920. Alternately, if the network wants the UE to back off the network sends backoff indicator at operation 920, and backoff parameter is pre-defined or signaled in SI. If the UE receives backoff parameter value (or index to predefined list of backoff values) or indication to backoff in RAR, the UE sets backoff scaling factor corresponding to the PRACH preamble retransmission attempt number (or based PREAMBLE_TRANSMISSION_COUNTER) at operation 930. Based on the determined backoff scaling factor, the UE select a random backoff time according to a uniform distribution between 0 and the 'Backoff Scaling factor*Backoff Parameter Value' at operation 940. The UE then delays the subsequent random access transmission by the backoff time at operation 950.

In an embodiment of the disclosure the backoff scaling factor is as defined in Equation 1. In the equation PREAMBLE_TRANSMISSION_COUNTER can be preamble retransmission attempt number.

$$\text{Scaling Factor} = \frac{1}{\text{PREAMBLE\_TRANSMISSION\_COUNTER}} \qquad \text{Equation 1}$$

Assume that the number of maximum retransmission i.e. Max Re-TX is set to 3 excluding the initial attempt. For $1^{st}$ retransmission (Re-TX) UE should apply short back-off. For $2^{nd}$ Re-TX UE should apply medium back-off. For $3^{rd}$ Re-TX UE should apply long back-off. The applied back-off is scaled in increasing order of the retransmission attempt.

In another embodiment of the disclosure the backoff scaling factor is as defined in Equation 2. In the equation PREAMBLE_TRANSMISSION_COUNTER can be preamble retransmission attempt number. The threshold can be predefined or signaled by the network.

$$\text{Scaling Factor} = \frac{1}{\left[\frac{(\text{PREAMBLE\_TRANSMISSION\_COUNTER})}{DIV \text{ (Threshold)}}\right] + 1} \qquad \text{Equation 2}$$

In another embodiment of the disclosure the backoff scaling factor is set to one if preamble retransmission attempt number (or PREAMBLE_TRANSMISSION_COUNTER) is less than or equal to a preamble retransmission attempt number threshold. The backoff scaling factor is set to 'X' if preamble retransmission attempt number is greater than preamble retransmission attempt number threshold. The value of 'X' and preamble retransmission attempt number threshold is signaled by the network. The signaling can be in SI (broadcast or on demand) or in dedicated signaling.

Scaling Factor=1 If PREAMBLE_TRANSMISSION_COUNTER<=Threshold

Scaling Factor=X If PREAMBLE_TRANSMISSION_COUNTER>Threshold   Equation 3

In another embodiment of the disclosure multiple (N) thresholds and corresponding backoff scaling factors can be defined or signaled. The backoff scaling factor is set as in Equation 4.

Scaling Factor=1 If PREAMBLE_TRANSMISSION_COUNTER<=Threshold 1

Scaling Factor=X If Threshold 1<PREAMBLE_TRANSMISSION_COUNTER<=Threshold 2

Scaling Factor=Y If Threshold 2<PREAMBLE_TRANSMISSION_COUNTER<=Threshold 3

. . .

Scaling Factor=Z If Threshold N−1<PREAMBLE_TRANSMISSION_COUNTER<=Threshold N   Equation 4

In another embodiment of the disclosure the mapping between backoff scaling factor and preamble retransmission attempt number (or PREAMBLE_TRANSMISSION_COUNTER) is signaled (either using periodic broadcast or on demand) in SI or can be pre-defined or can be signaled in dedicated RRC signaling. The UE select the backoff scaling factor corresponding to preamble retransmission attempt number (or PREAMBLE_TRANSMISSION_COUNTER).

In an embodiment of the disclosure, the UE first determines the backoff parameter value corresponding to access category as in Embodiment 1. The UE then determine the scaling factor based on retransmission attempt number (or based PREAMBLE_TRANSMISSION_COUNTER). Based on the determined backoff scaling factor, the UE select a random backoff time according to a uniform distribution between 0 and the 'Backoff Scaling factor*Backoff Parameter Value'. The UE then delays the subsequent random access transmission by the backoff time.

In an embodiment of the disclosure, the UE first determines the backoff parameter value corresponding to random access priority as in Embodiment 2. The UE then determine the backoff scaling factor based on retransmission attempt number (or based PREAMBLE_TRANSMISSION_COUNTER). Based on the determined backoff scaling factor, UE select a random backoff time according to a uniform distribution between 0 and the 'Backoff Scaling factor*Backoff Parameter Value'. The UE then delays the subsequent random access transmission by the backoff time.

In an embodiment of the disclosure, the UE first determine the backoff scaling factor 1 corresponding to random access category as in Embodiment 3. The UE then determine the backoff scaling factor 2 based on retransmission attempt number (or based PREAMBLE_TRANSMISSION_COUNTER). Based on the determined backoff scaling factors, the UE select a random backoff time according to a uniform distribution between 0 and the 'Backoff Scaling factor 1*Backoff Scaling factor 2*Backoff Parameter Value'. The UE then delays the subsequent random access transmission by the backoff time. The backoff parameter value is provided by the network in RAR or signaled to the UE in signaling (broadcast or dedicated).

In an embodiment of the disclosure, the UE first determine the backoff scaling factor 1 corresponding to access priority as in Embodiment 4. The UE then determine the backoff scaling factor 2 based on retransmission attempt number (or based PREAMBLE_TRANSMISSION_COUNTER). Based on the determined backoff scaling factors, UE select a random backoff time according to a uniform distribution between 0 and the 'Backoff Scaling factor 1*Backoff Scaling factor 2*Backoff Parameter Value'. The UE then delays the subsequent random access transmission by the backoff time. The backoff parameter value is provided by the network in RAR or signaled to the UE in signaling (broadcast or dedicated).

In another embodiment, after transmitting a PRACH preamble 'N' times, the UE performs backoff. 'N' can be pre-defined or signaled (either using periodic broadcast or on demand) in SI or in dedicated RRC signaling. The UE sets backoff scaling factor corresponding to retransmission attempt number (or PREAMBLE_TRANSMISSION_COUNTER) as explained earlier. Backoff parameter is pre-defined or signaled in SI in this case. Based on the determined backoff scaling factor, the UE select a random backoff time according to a uniform distribution between 0 and the 'Backoff Scaling factor*Backoff Parameter Value'. The UE then delays the subsequent random access transmission by the backoff time.

In another embodiment, after transmitting the PRACH preamble 'N' times, the UE performs backoff. 'N' can be pre-defined or signaled (either using periodic broadcast or on demand) in SI. Backoff parameter is pre-defined or signaled in SI. The UE select a random backoff time according to a uniform distribution between 0 and the Backoff Parameter Value'. The UE then delays the subsequent random access transmission by the backoff time.

Embodiment 6

In an embodiment of the disclosure, the UE skip backoff for certain events (e.g. high priority services such as URLLC or handover or beam failure recovery, etc.), even if the UE has received the indication to back off in RAR.

Power Ramping Mechanism

During the random access procedure, the UE first transmits the PRACH preamble and then waits for RAR in the RAR window corresponding to its RACH preamble transmission. Sometimes due to congestion on PRACH channel, PRACH preamble transmission may not be successful. If the UE does not receive the RAR corresponding to its PRACH preamble transmission during the RAR window, the UE retransmits the PRACH preamble. During the retransmission the UE ramps up the power by PowerRampingStep. PowerRampingStep is signaled in SI. All the UEs apply same PowerRampingStep. This is not efficient as latency requirement may be different for different UEs. The latency requirement may be different depending on event which triggered random access procedure and so on. So power ramping mechanism needs to be enhanced.

Embodiment 1

In one embodiment of the disclosure, PowerRampingStep parameter for RA is specified for each access category. There can be several access categories. An access category corresponds to a UE/device type and/or service type and/or call type and/or signaling type and/or application ID and/or slice type and/or slice ID and/or combination of one or more of UE/device type, service type, call type, signaling type or application type or slice type or slice ID.

Figure 10:
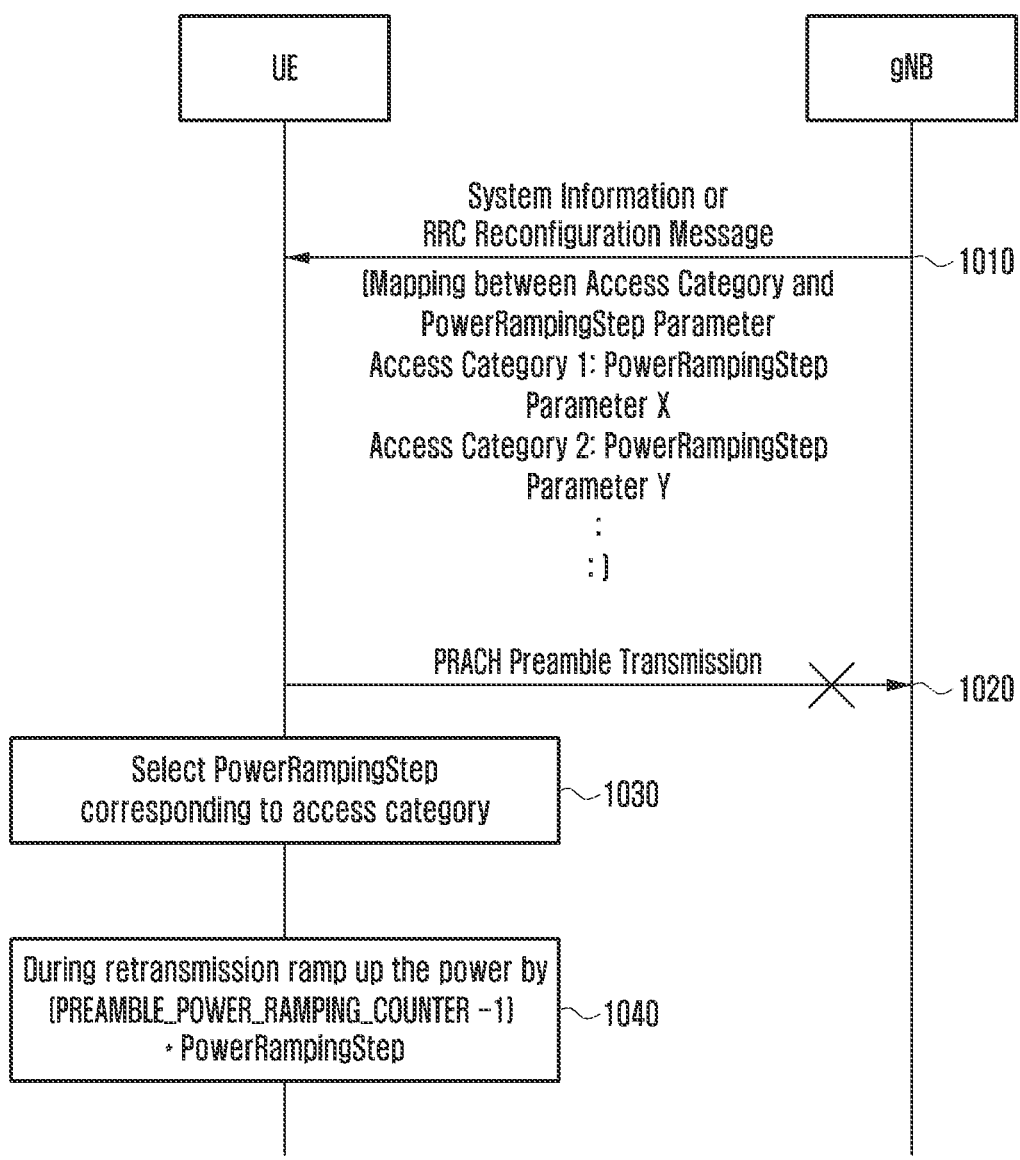
FIG. 10 illustrates an operation for power ramping according to an embodiment of the disclosure.

FIG. 10 illustrates an operation for power ramping according to an embodiment of the disclosure.

Referring to FIG. 10, the mapping between PowerRampingStep parameter and access category is signaled (either using periodic broadcast or on demand) by network (e.g. gNB) in SI at operation 1010. For example, gNB may transmit system information indicating that PowerRampingStep for Access Category 1 is PowerRampingStep X, PowerRampingStep for Access Category 2 is PowerRampingStep Y, and so on. The mapping between PowerRampingStep and Access Category can also be signaled in dedicated RRC signaling (e.g. RRC Reconfiguration message).

During the random access procedure, the UE transmits a PRACH preamble at operation 1020, and then waits for RAR in the RAR window corresponding to its RACH preamble transmission. However, it is possible that the PRACH preamble transmission fails, or it is possible that the PRACH preamble transmission is successful but the UE fails to receive RAR transmitted by the network. If the UE fails to receive RAR after transmitting the PRACH preamble transmission, the UE sets PowerRampingStep parameter value corresponding to access category at operation 1030. The access category may correspond to the access category of the UE or the access category for which the UE is accessing the cell or the access category for which the UE is performing random access. In an embodiment, UE may select the PowerRampingStep parameter value corresponding to access category upon initiation of random access procedure. Based on the determined PowerRampingStep parameter, the UE ramps up the PREAMBLE_RECEIVED_TARGET_POWER by (PREAMBLE_POWER_RAMPING_COUNTER−1)*PowerRampingStep at operation 1040. Based on the determined PowerRampingStep parameter, UE sets the PREAMBLE_RECEIVED_TARGET_POWER to preambleReceivedTargetPower+DELTA_PREAMBLE+(PREAMBLE_POWER_RAMPING_COUNTER−1)×preamblePowerRampingStep. PreambleReceivedTargetPower is configured by the network. DELTA_PREAMBLE is preamble format based power offset. It is pre-defined for various preamble formats.

Embodiment 2

In another embodiment of the disclosure, PowerRampingStep parameter for random access is specified for each access priority.

Figure 11:
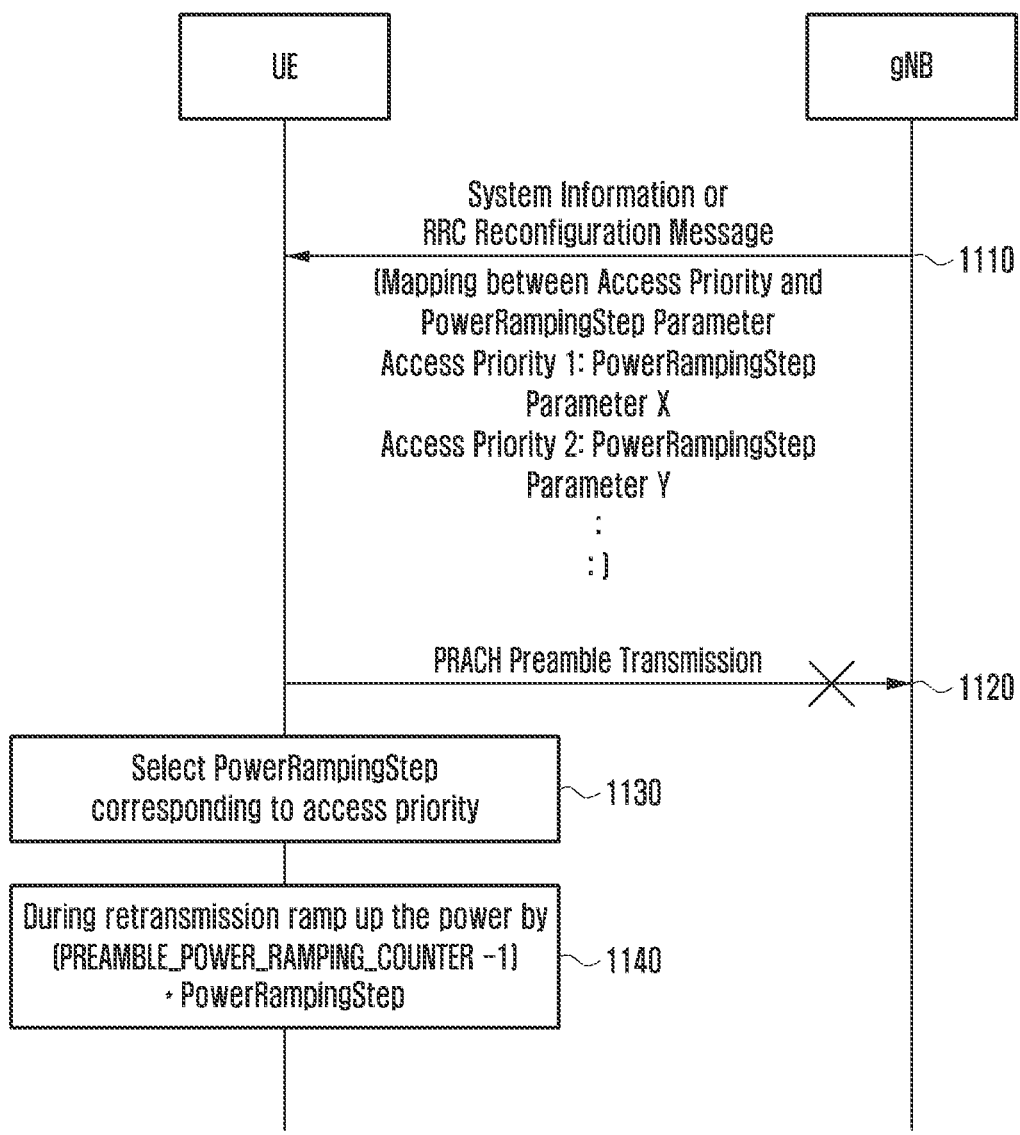
FIG. 11 illustrates an operation for power ramping according to an embodiment of the disclosure.

FIG. 11 illustrates an operation for power ramping according to an embodiment of the disclosure.

Referring to FIG. 11, the mapping between PowerRampingStep parameter and access priority is signaled (either using periodic broadcast or on demand) by network (e.g. gNB) in SI at operation 1110. For example, gNB may transmit the system information indicating that PowerRampingStep for Random Access Priority 1 is PowerRampingStep X, PowerRampingStep for Random Access Priority 2 is PowerRampingStep Y, and so on. The mapping between PowerRampingStep and Random Access Priority can also be signaled in dedicated RRC signaling (e.g. RRC Reconfiguration message). In an embodiment, there can be just two random access priorities, high priority random access and low (or normal priority) priority random access. Network signals the PowerRampingStep for high priority random access and normal random access in system information and/or in dedicated RRC signaling.

During the random access procedure, the UE transmits a PRACH preamble at operation 1120, and then waits for RAR in the RAR window corresponding to its RACH preamble transmission. However, it is possible that the PRACH preamble transmission fails, or it is possible that the PRACH preamble transmission is successful but the UE fails to receive RAR transmitted by the network. If the UE fails to receive RAR after transmitting the PRACH preamble transmission, the UE sets PowerRampingStep parameter value corresponding to access priority of random access procedure at operation 1130. In an embodiment, UE may select the PowerRampingStep parameter value corresponding to access priority upon initiation of random access procedure and applies the same to calculate power during PRACH preamble transmission. Based on the determined PowerRampingStep parameter, the UE ramps up the PREAMBLE_RECEIVED_TARGET_POWER by (PREAMBLE_POWER_RAMPING_COUNTER−1)*PowerRampingStep at operation 1140. Based on the determined PowerRampingStep parameter, UE sets the PREAMBLE_RECEIVED_TARGET_POWER to preambleReceivedTargetPower+DELTA_PREAMBLE+ (PREAMBLE_POWER_RAMPING_COUNTER−1)×preamblePowerRampingStep. PreambleReceivedTargetPower is configured by the network. DELTA_PREAMBLE is preamble format based power offset. It is pre-defined for various preamble formats.

If the random access is initiated for UL data transmission corresponding to a logical channel, then in one embodiment access priority of the random access procedure is the priority of that logical channel. The priority for each logical channel is configured by the network and signaled to the UE in dedicated RRC signaling. If the random access is initiated for UL data transmission corresponding to a numerology, then in another embodiment access priority of random access procedure is the priority of that numerology. The priority for each numerology is configured by the network and signaled to the UE in dedicated RRC signaling or broadcast signaling. If the random access is initiated for UL data transmission corresponding to a TTI duration, then in one embodiment access priority of the random access procedure is the priority of that TTI duration. The priority for each TTI duration is configured by the network and signaled to the UE in dedicated RRC signaling or broadcast signaling. In an embodiment, the network may signal random access priority (or random access priority can be pre-defined) for various events such as handover, UL data transmission, initial access, UL synchronization, on-demand SI request, initial RACH transmission, RACH retransmission, etc. The UE selects the PowerRampingStep parameter value corresponding to priority of event for which the UE is performing random access. In an embodiment, wherein only two random access priorities are configured, the network may indicate one or more events (such as handover, UL data transmission, initial access, UL synchronization, on-demand SI request, initial RACH transmission, RACH retransmission, beam failure recovery, etc.) for which high random access priority is applied. Alternately, one or more events (e.g. handover, beam failure recovery, etc.) for which high random access priority is applied are pre-defined.

In an embodiment, if handover (or random access triggered by reception of reconfiguration message including reconfigurationwithSync IE) is a high priority random access event and PowerRampingStep parameter for high priority random access event is configured, UE selects the PowerRampingStep parameter value corresponding to high priority random access event. If handover (or random access triggered by reception of reconfiguration message including reconfigurationwithSync IE) is a high priority random access event and PowerRampingStep parameter for high priority random access event is not configured, UE selects the PowerRampingStep parameter value corresponding to normal random access. The PowerRampingStep for normal random access is configured or signaled by network in dedicated RRC signaling or broadcast signaling using RACHConfigCommon IE. The another PowerRampingStep parameter for high priority random access event can also be configured or signaled by network in dedicated RRC signaling (e.g. RRCReconfiguration message) using RACHConfigCommon IE or in another IE (e.g. ReconfigurationWithSync). In an embodiment, for random access procedure initiated by reception of RRC Reconfiguration message (including ReconfigurationWithSync IE) from network, if PowerRampingStep is signaled in ReconfigurationWithSync IE, UE uses the PowerRampingStep parameter configured in ReconfigurationWithSync IE for random access procedure. If PowerRampingStep is not signaled in ReconfigurationWithSync IE UE uses the PowerRampingStep parameter configured in RACHConfigCommon IE for random access procedure. Network can signal PowerRampingStep parameter in ReconfigurationWithSync with different step value (e.g. higher value) compared to step value signaled in RACHConfigCommon IE.

In another embodiment, if beam failure recovery is a high priority random access event and PowerRampingStep parameter for high priority random access event is configured, UE selects the PowerRampingStep parameter value corresponding to high priority random access event. If beam failure recovery is a high priority random access event and PowerRampingStep parameter for high priority random access event is not configured, UE selects the PowerRampingStep parameter value corresponding to normal random access. The PowerRampingStep for normal random access is configured or signaled by network in dedicated RRC signaling or broadcast signaling using RACHConfigCommon IE. The another PowerRampingStep parameter for high priority random access event can also be configured or signaled by network in dedicated RRC signaling using RACHConfigCommon IE or in another IE (e.g. BeamFailureRecoveryConfig). In an embodiment, for beam failure recovery, if BeamFailureRecoveryConfig IE is signaled to UE by network, UE uses the PowerRampingStep parameter configured in BeamFailureRecoveryConfig IE for random access procedure for beam failure recovery. If BeamFailureRecoveryConfig IE is not signaled to UE by network UE uses the PowerRampingStep parameter configured in RACHConfigCommon IE for random access procedure for beam failure recovery. Network can signal PowerRampingStep parameter in BeamFailureRecoveryConfig with different step value (e.g. higher value) compared to step value signaled in RACHConfigCommon IE.

In an embodiment, the network may signal random access priority (or random access priority can be pre-defined) for various services such as URLLC, eMBB, MTC, V2X, D2D, etc. The UE selects the PowerRampingStep parameter value corresponding to priority of service for which the UE is performing random access. In an embodiment, the network may signal random access priority (or random access priority can be pre-defined) for various slices (slice type or slice IDs). The UE selects the PowerRampingStep parameter value corresponding to priority of slice for which the UE is performing random access.

Embodiment 3

In one embodiment of the disclosure, a scaling factor for PowerRampingStep is specified for each access category. If scaling factor is not specified for an access category, a default scaling factor (e.g. 1) can be used.

Figure 12:
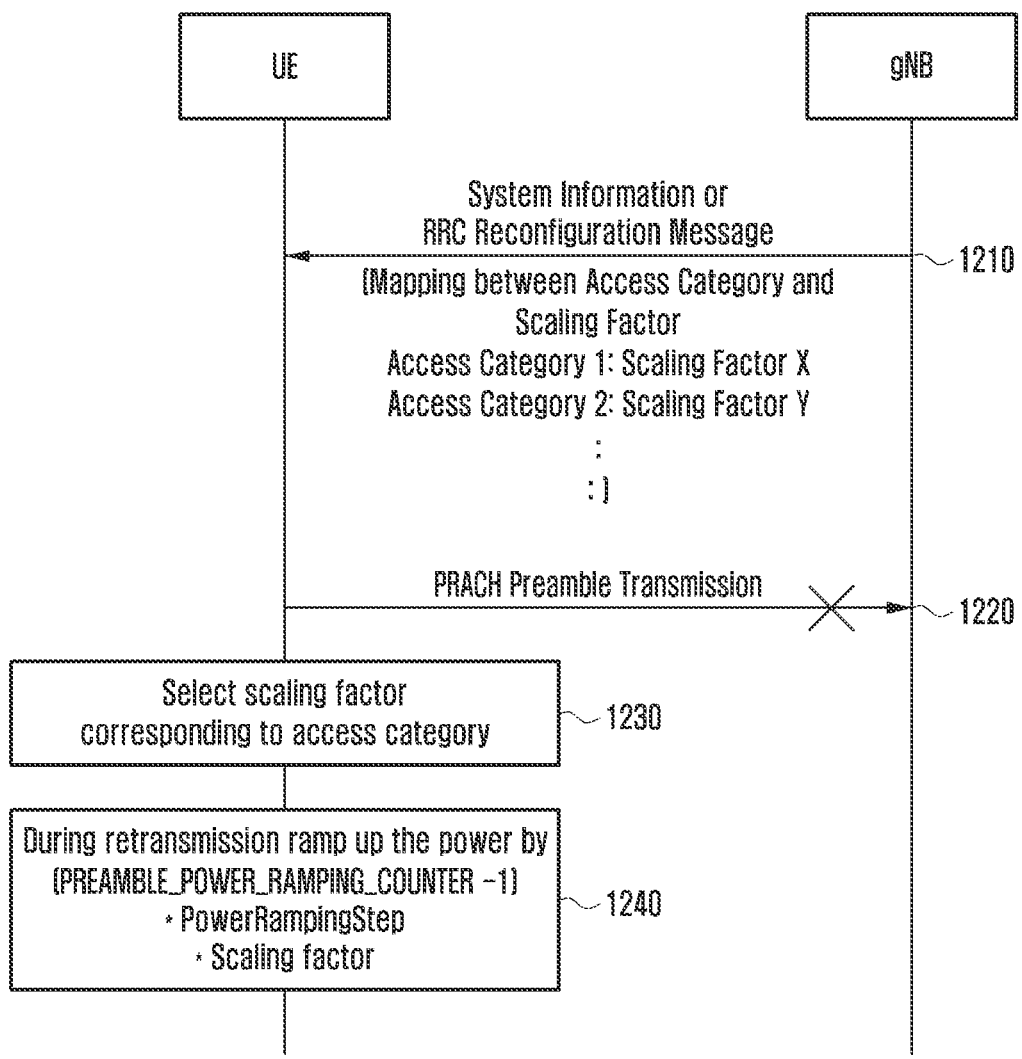
FIG. 12 illustrates an operation for power ramping according to an embodiment of the disclosure.

FIG. 12 illustrates an operation for power ramping according to an embodiment of the disclosure.

Referring to FIG. 12, the mapping between scaling factor and access category is signaled (either using periodic broadcast or on demand) by network (e.g. gNB) in SI at operation 1210. The mapping between scaling factor and access category can also be signaled in dedicated RRC signaling (e.g. RRC Reconfiguration message). In another embodiment, the mapping between scaling factor and access category can be pre-defined. PowerRampingStep is signaled in SI.

During the random access procedure, the UE transmits the PRACH preamble at operation 1220, and then waits for RAR in the RAR window corresponding to its RACH preamble transmission. However, it is possible that PRACH preamble transmission fails, or it is possible that the PRACH preamble transmission is successful but the UE fails to receive RAR transmitted by the network. If the UE fails to receive RAR after transmitting the PRACH preamble transmission, the UE selects scaling factor value corresponding to access category at operation 1230. In an embodiment, UE may select the scaling factor value corresponding to access category upon initiation of random access procedure and applies the same to calculate power during PRACH preamble transmission. Based on the determined scaling factor and PowerRampingStep parameter, the UE ramps up the PREAMBLE_RECEIVED_TARGET_POWER by (PREAMBLE_POWER_RAMPING_COUNTER−1) *PowerRampingStep*scaling factor at operation 1240.

Based on the determined PowerRampingStep parameter, UE sets the PREAMBLE_RECEIVED_TARGET_POWER to preambleReceivedTargetPower+DELTA_PREAMBLE+ (PREAMBLE_POWER_RAMPING_COUNTER−1)×preamblePowerRampingStep×scaling factor. PreambleReceivedTargetPower is configured by the network. DELTA_PREAMBLE is preamble format based power offset. It is pre-defined for various preamble formats.

Embodiment 4

In another embodiment of the disclosure, scaling factor for PowerRampingStep is specified for each access priority.

Figure 13:
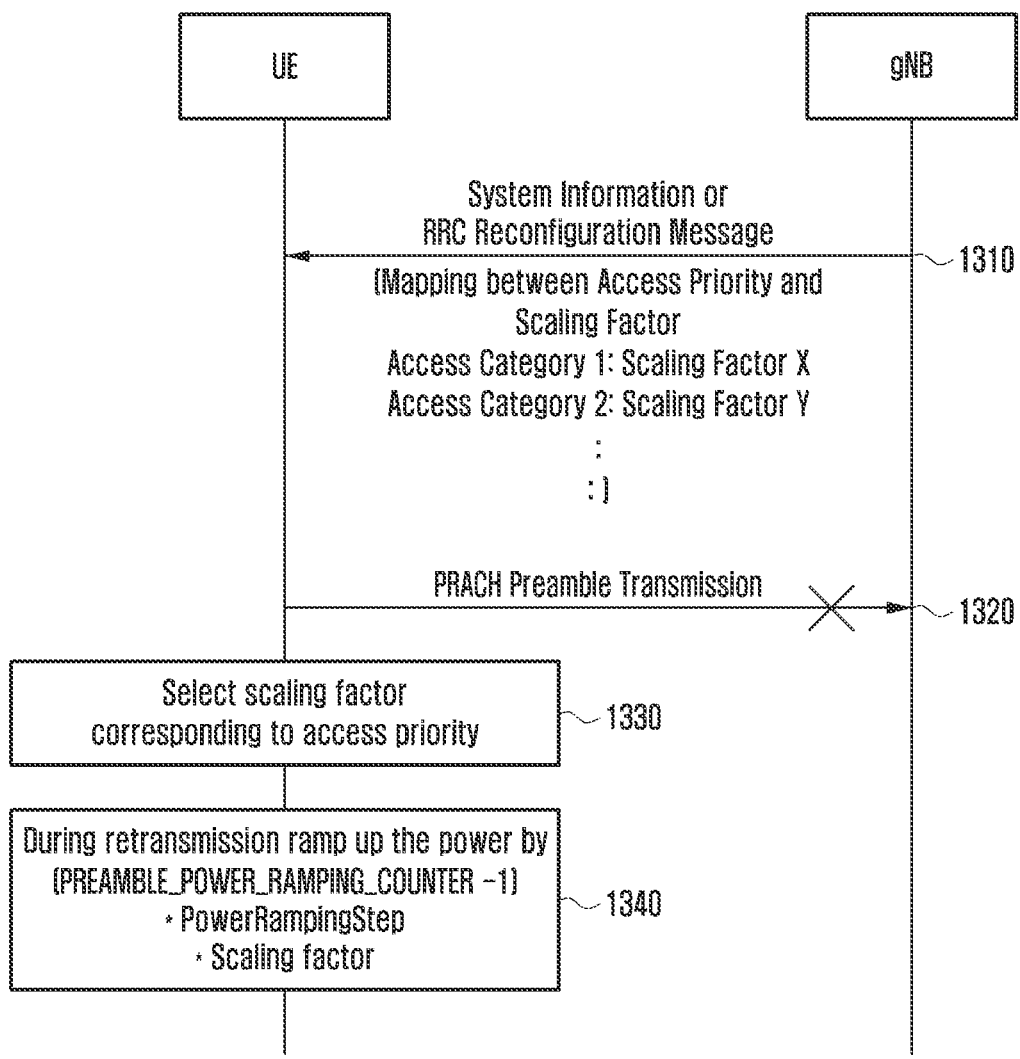
FIG. 13 illustrates an operation for power ramping according to an embodiment of the disclosure.

FIG. 13 illustrates an operation for power ramping according to an embodiment of the disclosure.

Referring to FIG. 13, the mapping between scaling factor and random access priority is signaled (either using periodic broadcast or on demand) by network (e.g. gNB) in SI at operation 1310. The mapping between scaling factor and Random Access Priority can also be signaled in dedicated RRC signaling (e.g. RRC Reconfiguration message). For example, gNB may transmit system information indicating that scaling factor for Random Access Priority 1 is Scaling Factor X, scaling factor for Random Access Priority 2 is Scaling Factor Y, and so on. In another embodiment, the mapping between scaling factor and access priority can be pre-defined. If scaling factor is not specified for a random access priority, a default scaling factor (e.g. 1) can be used. In an embodiment, there can be just two random access priorities, high priority and low (or normal priority). In this case the scaling factor may be signaled in system information or in dedicated RRC signaling only for high priority random access. The scaling factor for low (or normal priority) priority random access is 1 (i.e. no scaling is applied).

During the random access procedure, the UE transmits a PRACH preamble at operation 1320, and then waits for RAR in the RAR window corresponding to its RACH preamble transmission. However, it is possible that the PRACH preamble transmission fails, or it is possible that the PRACH preamble transmission is successful but the UE fails to receive RAR transmitted by the network. If the UE fails to receive RAR after transmitting the PRACH preamble transmission, the UE selects scaling factor value corresponding to access priority at operation 1330. In an embodiment, UE may select the scaling factor corresponding to access priority upon initiation of random access procedure and applies the same to calculate power during PRACH preamble transmission. Based on the determined scaling factor and PowerRampingStep parameter, the UE ramps up the PREAMBLE_RECEIVED_TARGET_POWER by (PREAMBLE_POWER_RAMPING_COUNTER−1) *PowerRampingStep*scaling factor at operation 1340.

Based on the determined PowerRampingStep parameter, UE sets the PREAMBLE_RECEIVED_TARGET_POWER to preambleReceivedTargetPower+DELTA_PREAMBLE+ (PREAMBLE_POWER_RAMPING_COUNTER−1)×preamblePowerRampingStep×scaling factor. PreambleReceivedTargetPower is configured by the network. DELTA_PREAMBLE is preamble format based power offset. It is pre-defined for various preamble formats.

If the random access is initiated for UL data transmission corresponding to a logical channel, then in one embodiment access priority of the random access procedure is the priority of that logical channel. The priority for each logical channel is configured by the network and signaled to the UE in dedicated RRC signaling. If the random access is initiated for UL data transmission corresponding to a numerology, then in another embodiment access priority of the random access procedure is the priority of that numerology. The priority for each numerology is configured by the network and signaled to the UE in dedicated RRC signaling or broadcast signaling. If the random access is initiated for UL data transmission corresponding to a TTI duration, then in one embodiment access priority of the random access procedure is the priority of that TTI duration. The priority for each TTI duration is configured by the network and signaled to the UE in dedicated RRC signaling or broadcast signaling. In an embodiment, the network may signal priority (or priority can be pre-defined) for various events such as handover, UL data transmission, initial access, UL synchronization, on-demand SI request, initial RACH transmission, RACH retransmission, etc. In an embodiment, wherein only two random access priorities are configured, the network may indicate the one or more events (such as handover, UL data transmission, initial access, UL synchronization, on-demand SI request, initial RACH transmission, RACH retransmission, beam failure recovery, etc.) for which high access priority is applied. Alternately, one or more the one or more events (e g handover, beam failure recovery, etc.) for which high random access priority is applied are pre-defined. The UE selects the backoff parameter value corresponding to priority of event for which the UE is performing random access. In an embodiment, if handover (or random access triggered by reception of reconfiguration message including reconfigurationwithSync IE) is a high priority random access event and scaling factor for high priority random access event (i.e. handover) is configured, UE selects the configured scaling factor. If handover (or random access triggered by reception of reconfiguration message including reconfigurationwithSync IE) is a high priority random access event and scaling factor for high priority random access event (i e handover) is not configured, UE selects the scaling factor equal to 1. In another embodiment, if beam failure recovery is a high priority random access event and scaling factor for high priority random access event (i.e. beam failure recovery) is configured, UE selects the configured scaling factor. If beam failure recovery is a high priority random access event and scaling factor for high priority random access event (i.e. beam failure recovery) is not configured, UE selects the scaling factor equal to 1.

In an embodiment, the network may signal random access priority (or random access priority can be pre-defined) for various services such as URLLC, eMBB, MTC, V2X, D2D etc. The UE selects the scaling factor corresponding to priority of service for which the UE is performing random access. In an embodiment, the network may signal random access priority (or random access priority can be pre-defined) for various slices (slice type or slice IDs). The UE selects the scaling factor value corresponding to priority of slice for which the UE is performing random access.

Figure 14:
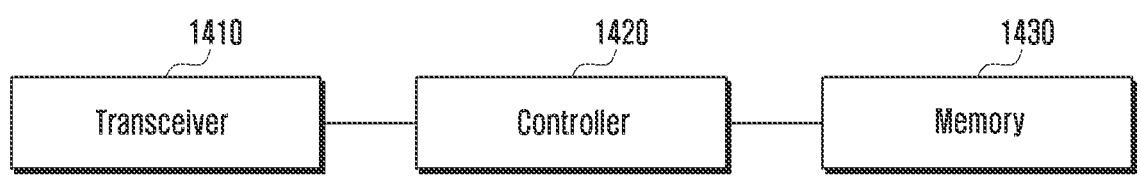
FIG. 14 is a block diagram of a terminal according to an embodiment of the disclosure.

FIG. 14 is a block diagram of a terminal according to an embodiment of the disclosure.

Referring to FIG. 14, a terminal includes a transceiver 1410, a controller 1420 and a memory 1430. The transceiver 1410, the controller 1420 and the memory 1430 are configured to perform the operations of the UE illustrated in FIGS. 1 to 13, or described above. Although the transceiver 1410, the controller 1420 and the memory 1430 are shown as separate entities, they may be realized as a single entity like a single chip. The transceiver 1410, the controller 1420 and the memory 1430 may be electrically connected to or coupled with each other.

The transceiver 1410 may transmit and receive signals to and from the other network entities, e.g. a base station.

The controller 1420 may control the terminal to perform a function according to one of the embodiments described above. For example, the controller 1420 may be configured to control the transceiver 1410 to transmit a random access preamble associated with a random access procedure to the base station and control the transceiver 1410 to receive a random access response including information on a backoff parameter value from the base station. The information on a backoff parameter may refer to a backoff indicator including an index to predefined list of backoff values. The controller 1420 is configured to identify a scaling factor for backoff based on a priority of the random access procedure or the event which triggered the random access procedure. Only two categories of priorities (e.g., high priority RACH access and normal RACH access) may be defined. In other words, the random access has one of a high access priority or a normal access priority. The events for which high access priority is applied are pre-defined. For example, events for high priority RACH access may be pre-defined as a handover (or random access triggered by reception of reconfiguration message including reconfigurationwithSync IE) and a beam failure recovery. Therefore, if the random access is for a handover (or random access triggered by reception of reconfiguration message including reconfigurationwithSync IE) or a beam failure recovery, the terminal determines the random access as the high access priority. The information on the scaling factor (e.g. the mapping between scaling factor and access priority) may be configured by the network for backoff, and the controller 1420 may be configured to control the transceiver 1410 to receive information on the scaling factor from the base station. The controller 1420 may be configured to determine a random backoff time based on the scaling factor and the backoff parameter value. For example, the controller 1420 may be configured to select the random backoff time according to a uniform distribution between 0 and the 'Scaling factor*Backoff Parameter Value.' The terminal may delay the subsequent random access transmission by the backoff time. In other words, the controller 1420 may be configured to control the transceiver 1410 to transmitting the subsequent random access preamble to the base station after the random backoff time. In addition, a power ramping step is configured for the high priority RACH access. Therefore, if the terminal fails to receive a random access response from the base station in response to transmitting the random access preamble, the controller 1420 may be configured to determine a power ramping step parameter based on the priority of the random access, and control to the transceiver 1410 to retransmit the random access preamble using the power ramping step to the base station The controller 1420 may refer to a circuitry, an application-specific integrated circuit (ASIC), or at least one processor.

In an embodiment, the operations of the terminal may be implemented using the memory 1430 storing corresponding program codes. Specifically, the terminal may be equipped with the memory 1430 to store program codes implementing desired operations. To perform the desired operation, the controller 1420 may read and execute the program codes stored in the memory 1430 by using a processor or a central processing unit (CPU).

Figure 15:
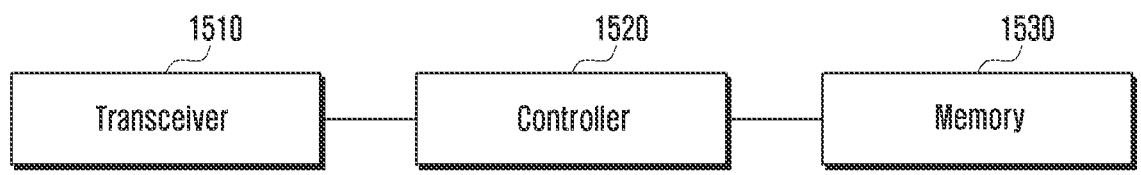
FIG. 15 is a block diagram of a base station according to an embodiment of the disclosure.

FIG. 15 is a block diagram of a base station according to an embodiment of the disclosure.

Referring to FIG. 15, a base station includes a transceiver 1510, a controller 1520 and a memory 1530. The transceiver 1510, the controller 1520 and the memory 1530 are configured to perform the operations of the network (e.g. gNB) illustrated in FIGS. 1 to 13, or described above. Although the transceiver 1510, the controller 1520 and the memory 1530 are shown as separate entities, they may be realized as a single entity like a single chip. The transceiver 1510, the controller 1520 and the memory 1530 may be electrically connected to or coupled with each other.

The transceiver 1510 may transmit and receive signals to and from the other network entities, e.g. a terminal.

The controller 1520 may control the base station to perform a function according to one of the embodiments described above. For example, the controller 1520 is configured to control the transceiver 1510 to receive a random access preamble associated with a random access procedure from the terminal, transmit a random access response including information on a backoff parameter value to the terminal, and receive a subsequent random access preamble after a random backoff time from the terminal. As described above, the random backoff time is determined based on a scaling factor for backoff and the backoff parameter value, and the scaling factor is determined based on a priority of the random access procedure or the event which triggered the random access procedure.

The controller 1520 may refer to a circuitry, an application-specific integrated circuit (ASIC), or at least one processor.

In an embodiment, the operations of the base station may be implemented using the memory 1530 storing corresponding program codes. Specifically, the base station may be equipped with the memory 1530 to store program codes implementing desired operations. To perform the desired operation, the controller 1520 may read and execute the program codes stored in the memory 1530 by using a processor or a central processing unit (CPU).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal for a random access procedure, the method comprising:
    receiving, from a base station, configuration information for the random access procedure;
    transmitting, to the base station, a random access preamble based on the configuration information;
    determining that a random access problem is detected based on a number of transmissions of the random access preamble; and
    in case that the random access problem is detected and the transmission of the random access preamble is triggered for requesting system information for the terminal in a radio resource control (RRC) idle state or an RRC inactive state, indicating, by a medium access control (MAC) entity, the random access problem to an RRC entity and stopping, by the MAC entity, the random access procedure.

2. The method of claim 1, wherein the random access problem is detected in case that the number of transmissions of the random access preamble reaches a predetermined value.

3. The method of claim 1, wherein the random access problem is detected in case that a random access response is not received from the base station as a response to the random access preamble during a random access response window.

4. The method of claim 1, wherein the random access problem is detected in case that a contention resolution timer for the random access procedure expires.

5. A terminal comprising:
    a transceiver; and
    at least one processor coupled with the transceiver and configured to:
        receive, from a base station, configuration information for a random access procedure,
        transmit, to the base station, a random access preamble based on the configuration information,
        determine that a random access problem is detected based on a number of transmissions of the random access preamble, and
        in case that the random access problem is detected and the transmission of the random access preamble is triggered for requesting system information for the terminal in a radio resource control (RRC) idle state or an RRC inactive state, indicate, by a medium access control (MAC) entity, the random access problem to an RRC entity and, stop, by the MAC entity, the random access procedure.

6. The terminal of claim 5, wherein the random access problem is detected in case that the number of transmissions of the random access preamble reaches a predetermined value.

7. The terminal of claim 5, wherein the at least one processor is further configured to determine that the random access problem is detected in case that a random access response is not received from the base station as a response to the random access preamble during a random access response window.

8. The terminal of claim 5, wherein the at least one processor is further configured to determine that the random access problem is detected in case that a contention resolution timer for the random access procedure expires.

* * * * *